(12) United States Patent
Gschwind et al.

(10) Patent No.: US 10,489,129 B2
(45) Date of Patent: Nov. 26, 2019

(54) LAYERED VECTOR ARCHITECTURE COMPATIBILITY FOR CROSS-SYSTEM PORTABILITY

(71) Applicant: INTERNATIONAL BUSINESS MACHINES CORPORATION, Armonk, NY (US)

(72) Inventors: Michael K. Gschwind, Chappaqua, NY (US); Ronald I. McIntosh, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/943,188

(22) Filed: Apr. 2, 2018

(65) Prior Publication Data
US 2018/0225101 A1 Aug. 9, 2018

Related U.S. Application Data

(63) Continuation of application No. 14/941,551, filed on Nov. 14, 2015, now Pat. No. 9,959,102, which is a
(Continued)

(51) Int. Cl.
*G06F 8/41* (2018.01)
*G06F 7/76* (2006.01)
(Continued)

(52) U.S. Cl.
CPC ............... *G06F 8/443* (2013.01); *G06F 7/76* (2013.01); *G06F 7/768* (2013.01); *G06F 8/41* (2013.01);
(Continued)

(58) Field of Classification Search
None
See application file for complete search history.

(56) References Cited

U.S. PATENT DOCUMENTS 5,027,272 A 6/1991 Samuels
5,560,009 A 9/1996 Lenkov et al.
(Continued)

FOREIGN PATENT DOCUMENTS

CA 1264859 A 1/1990
GB 2409067 B 12/2006
(Continued)

OTHER PUBLICATIONS

Rapp, John, et al., "System for Vectorized Hardware Accelerated Functions with Automatic Interface Generation," IP.com No. 000171310, Jun. 4, 2008, pp. 1-22.
(Continued)

*Primary Examiner* — Tuan C Dao
*Assistant Examiner* — William C Wood
(74) *Attorney, Agent, or Firm* — Steven Chiu, Esq.; Blanche E. Schiller, Esq.; Heslin Rothenberg Farley & Mesiti P.C.

(57) ABSTRACT

An application that includes intrinsics defined in one architecture is to execute without change on a different architecture. Program code that depends on vector element ordering is obtained, and that program code is part of an application including one or more intrinsics. The one or more intrinsics are mapped from a first system architecture for which the application was written to a second system architecture. One or more operations of the program code are then converted from a first data layout to a second data layout. The application, including the mapped intrinsics and the converted data layout, is to be executed on a processor of the different architecture.

20 Claims, 19 Drawing Sheets

Related U.S. Application Data continuation of application No. 14/823,025, filed on Aug. 11, 2015, now Pat. No. 9,996,326.

(60) Provisional application No. 62/036,741, filed on Aug. 13, 2014.

(51) Int. Cl.
  *G06F 9/30* (2018.01)
  *G06F 11/36* (2006.01)
  *G06F 13/40* (2006.01)

(52) U.S. Cl.
  CPC ........ *G06F 8/4441* (2013.01); *G06F 9/30036* (2013.01); *G06F 11/3624* (2013.01); *G06F 13/4013* (2013.01)

(56) References Cited

U.S. PATENT DOCUMENTS

| | | |
|---|---|---|
| 5,721,924 A | 10/1998 | Kitadate |
| 5,828,884 A | 10/1998 | Lee et al. |
| 5,881,288 A | 3/1999 | Sumi et al. |
| 5,887,183 A | 3/1999 | Agarwal et al. |
| 5,968,164 A | 10/1999 | Loen et al. |
| 5,987,248 A | 11/1999 | Murayama et al. |
| 5,996,057 A | 11/1999 | Scales, III et al. |
| 6,065,106 A | 5/2000 | Deao et al. |
| 6,351,750 B1 | 2/2002 | Duga et al. |
| 6,728,874 B1 | 4/2004 | Sijstermans et al. |
| 7,136,953 B1 | 11/2006 | Bisson et al. |
| 7,197,625 B1 | 3/2007 | Van Hook et al. |
| 7,426,597 B1 | 9/2008 | Tsu et al. |
| 7,552,427 B2 | 6/2009 | Adiletta et al. |
| 7,600,155 B1 | 10/2009 | Nickolls et al. |
| 7,716,642 B1 | 5/2010 | Michael et al. |
| 8,010,953 B2 | 8/2011 | Gschwind et al. |
| 8,108,846 B2 | 1/2012 | Gschwind et al. |
| 8,161,266 B2 | 4/2012 | Colavin |
| 8,255,886 B2 | 8/2012 | Lachner |
| 8,255,891 B2 | 8/2012 | Chen et al. |
| 8,458,681 B1 | 6/2013 | Coutant et al. |
| 8,566,645 B2 | 10/2013 | Rentschler et al. |
| 8,725,990 B1 | 5/2014 | Karandikar et al. |
| 8,775,341 B1 | 7/2014 | Commons |
| 9,256,505 B2 | 2/2016 | Chakravarty |
| 9,430,233 B2 | 8/2016 | Gschwind et al. |
| 9,563,534 B1 | 2/2017 | Gschwind et al. |
| 9,569,188 B1 | 2/2017 | Gschwind et al. |
| 9,569,190 B1 | 2/2017 | Gschwind et al. |
| 9,588,746 B2 | 3/2017 | Gschwind et al. |
| 9,594,668 B1 | 3/2017 | Gschwind et al. |
| 9,606,780 B2 | 3/2017 | Gschwind et al. |
| 9,619,214 B2 | 4/2017 | Gschwind et al. |
| 9,626,168 B2 | 4/2017 | Gschwind et al. |
| 2001/0049763 A1 | 12/2001 | Barry et al. |
| 2002/0019973 A1* | 2/2002 | Hayashida ............... G06F 8/47 717/106 |
| 2002/0199173 A1 | 12/2002 | Bowen |
| 2003/0182650 A1 | 9/2003 | Smith et al. |
| 2004/0054877 A1 | 3/2004 | Macy et al. |
| 2004/0158819 A1 | 8/2004 | Cuomo et al. |
| 2004/0221268 A1 | 11/2004 | Nichols et al. |
| 2004/0221274 A1 | 11/2004 | Bross et al. |
| 2004/0221276 A1 | 11/2004 | Raj |
| 2004/0268094 A1 | 12/2004 | Abdallah et al. |
| 2005/0066146 A1 | 3/2005 | Barry et al. |
| 2005/0125647 A1 | 6/2005 | Symes et al. |
| 2005/0198483 A1 | 9/2005 | Park et al. |
| 2005/0213837 A1 | 9/2005 | Boykov et al. |
| 2005/0283773 A1 | 12/2005 | Eichenberger et al. |
| 2006/0125663 A1 | 6/2006 | Adiletta et al. |
| 2006/0171694 A1 | 8/2006 | Kamimura et al. |
| 2006/0243787 A1 | 11/2006 | Dravnieks et al. |
| 2007/0192762 A1 | 8/2007 | Eichenberger et al. |
| 2007/0226469 A1 | 9/2007 | Wilson et al. |
| 2008/0098376 A1 | 4/2008 | Fulton et al. |
| 2008/0141012 A1 | 6/2008 | Yehia |
| 2008/0288930 A1 | 11/2008 | Chen et al. |
| 2009/0089547 A1 | 4/2009 | Moyer et al. |
| 2009/0089763 A1 | 4/2009 | Chen et al. |
| 2009/0198977 A1 | 8/2009 | Gschwind et al. |
| 2010/0042815 A1 | 2/2010 | Gonion et al. |
| 2010/0058302 A1 | 3/2010 | Broscaru et al. |
| 2010/0095285 A1 | 4/2010 | Gschwind |
| 2011/0154303 A1 | 6/2011 | Rice et al. |
| 2011/0209003 A1 | 8/2011 | Matsukawa |
| 2011/0271259 A1 | 11/2011 | Moench et al. |
| 2012/0030652 A1 | 2/2012 | Jelinek |
| 2012/0060016 A1 | 3/2012 | Eichenberger et al. |
| 2012/0185836 A1 | 7/2012 | Loenko |
| 2013/0247010 A1 | 9/2013 | Bradbury et al. |
| 2013/0263092 A1 | 10/2013 | Chikahisa et al. |
| 2014/0019506 A1 | 1/2014 | Kuo |
| 2014/0095842 A1 | 4/2014 | Caprioli et al. |
| 2014/0164733 A1 | 6/2014 | Jha |
| 2014/0192049 A1 | 7/2014 | Stanley et al. |
| 2014/0196013 A1 | 7/2014 | Orr et al. |
| 2014/0201450 A1 | 7/2014 | Haugen |
| 2014/0215112 A1 | 7/2014 | Iyer et al. |
| 2014/0215437 A1 | 7/2014 | Iyer et al. |
| 2014/0298336 A1 | 10/2014 | Taniuchi |
| 2015/0095626 A1 | 4/2015 | Nakagawa |
| 2015/0106793 A1 | 4/2015 | Kahne et al. |
| 2015/0169294 A1 | 6/2015 | Brock et al. |
| 2015/0186232 A1 | 7/2015 | Conner et al. |
| 2015/0261636 A1 | 9/2015 | Chakravarty |
| 2015/0277880 A1 | 10/2015 | Gschwind et al. |
| 2015/0331783 A1 | 11/2015 | Blackman et al. |
| 2016/0048379 A1 | 2/2016 | Gschwind et al. |
| 2016/0048417 A1 | 2/2016 | Gschwind et al. |
| 2016/0048445 A1 | 2/2016 | Gschwind et al. |
| 2016/0179525 A1 | 6/2016 | Gschwind et al. |
| 2016/0179529 A1 | 6/2016 | Corbal et al. |
| 2016/0216951 A1 | 7/2016 | Kruglick |
| 2016/0217197 A1 | 7/2016 | Rachlin et al. |
| 2017/0052768 A1 | 2/2017 | Gschwind et al. |
| 2017/0052769 A1 | 2/2017 | Gschwind et al. |

FOREIGN PATENT DOCUMENTS

| | | |
|---|---|---|
| WO | WO2007103195 A2 | 9/2007 |
| WO | WO2010029794 A1 | 3/2010 |

OTHER PUBLICATIONS

IBM, "A Virtual Group Multicast Approach to Enhance Sysplex Communication on Mainframe," IP.com No. 000181771, Apr. 13, 2009, pp. 1-6.

Mell, Peter and Tim Grance, "The NIST Definition of Cloud Computing," National Institute of Standards and Technology, Information Technology Laboratory, Special Publication 800-145, Sep. 2011, pp. 1-7.

Gschwind, et al., "Optimizing Vector Accesses on an Endian-Based Multi-Endian Instruction Set Architecture," U.S. Appl. No. 62/036,741, filed Aug. 13, 2014, pp. 1-58.

IBM, "Power ISA™ Version 2.07B," International Business Machines Corporation, Apr. 9, 2015, pp. 1-1527.

IBM, "z/Architecture Principles of Operation," IBM® Publication No. SA22-7832-10, Eleventh Edition, Mar. 2015, pp. 1-1732.

Kim et al., "Flow Precedence Analysis for Optimizing Compilers", Technical Disclosure, Ip.com IPCOM000082549, Dec. 1, 1974, pp. 1-4 (+ Cover).

Ziantz, LH. et al., "Run-time Optimization of Sparse Matric0Vector Multiplication on SIMD Machines", PARLE '94, Parallel Architectures and Languages Europe, 6th International PARLE Conference Proceedings, Jul. 1994 (pp. 313-322).

Burger et al., The SimpleScalar Tool Set, Verison 2.0, [Online] 1997, ACM SIGARCH Computer Architecture News 25.3, 1997 (No further date information available) pp. 1-21.

Watson et al., "The Architecture of a Parallel Relative Debugger", [Online] 2000, Proceedings of the 13th International Conference on

(56) References Cited

OTHER PUBLICATIONS

Parallel and Distributed Computer Systems, Oct. 2000, [Retrieved from the Internet] pp. 1-9.
Lee, R., et al., "Siongle-Cycle Bit Permutations with MOMR Execution", Journal of Computer Science and Technology, Sep. 2005, vol. 20, Issue 5, pp. 1-10.
Ren, G., Compiling Vector Programs for SIMD Devices, Dissertation, University of Illinois at Urbana-Champaign, 2006, (No further data information available) pp. i-xii & 1-140.
Software Patent Institute et al., "Compiling Ordinary Programs for Execution on an Asynchronous Multiprocess",and IP.com Prior Art Database Technical Disclosure, http://ip.com/IPCOM/000148160, Apr. 12, 2007, pp. i-vii & 1-142 (+ Cover pages).
Software Patent Institute et al., "Measuring User Programs for a SIMD Processor", an IP.com Prior Art Database Technical Disclosure, http://ip.com/IPCOM/000150988, Apr. 30, 1976, pp. 1-36 (+ Cover)
Lokhmotov, A., et al., "Optimal Bit-Reversal Using Vector Permutations", Proceedings of the Nineteenth Annual ACM Symposium on Parallel Algorithms and Architectures, Jun. 2007, (pp. 198-199).
Rajamohan, Srijith, "A Neural Network Based Classifier on the Cell Broadband Engine", The Pennsylvania State University, Aug. 2009, pp. 1-83.
Shen, L., et al, Implicit Data Permutation for SIMD Devices, $4^{th}$ International Conference on Embedded and Multimedia Computing, May 2009, pp. 1-6.
Bailey, et al., "Processor-Centric Design: Processors, Multi-Processors, and Software", Chapter 6 of ESL Models and their Applications, Embedded Systems, 2010 (No further date information available) pp. 225-272.
Brevnov et al, "Writing a Bi-Endian Compiler", Dr. Dobb's, The World of Software Development, Jul. 2, 2012, pp. 1-17.
Rohou et al, "Vectorization Technology to Improve Interpreter Performance", ACM Transactions on Architecture and Code Optimization, vol. 9, No. 4, Article 26, Jan. 2013, pp. 26:1-26:22.
Coding for NEON—Part 5: Rearranging Vectors, ARM Connected Community, 2013, [Retrieved on Sep. 21, 2017 from the Internet] pp. 1-9.
List of IBM Patents or Patent Applications Treated as Related, Apr. 2, 2018, 2 pages.

\* cited by examiner

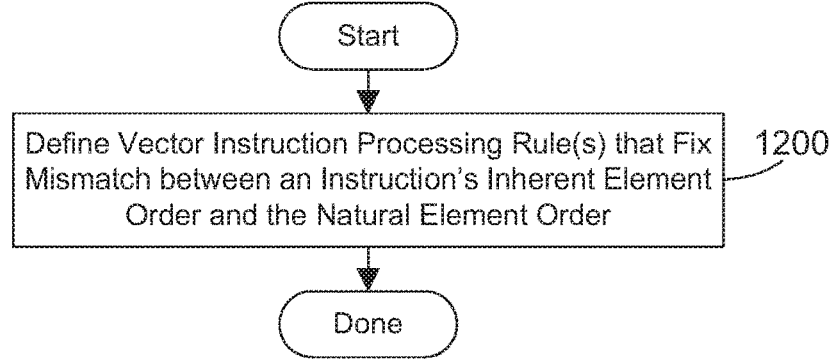

FIG. 12

| Vector Instruction Processing Rules | 127 |
|---|---|
| For all intermediate-representation instructions that specify element number, generate machine instruction(s) that change element number | 1310 |
| For all intermediate-representation instructions that specify odd or even element numbers, generate machine instruction(s) using odd instead of even and even instead of odd | 1320 |
| For all intermediate-representation instructions that generate one or more load instructions, insert vreverse instruction after each load | 1330 |
| For all intermediate-representation instructions that generate one or more store instructions, insert vreverse instruction before each store | 1340 |
| For all intermediate-representation instructions that have input arguments that are to be treated as an extended vector, generate instructions with input arguments in reverse order | 1350 |
| For all intermediate-representation instructions that reference "high half" or "low half" of a vector, generate opposite instructions referencing "low half" or "high half" | 1360 |

FIG. 13

LAYERED VECTOR ARCHITECTURE COMPATIBILITY FOR CROSS-SYSTEM PORTABILITY

This application is a continuation of co-pending U.S. patent application Ser. No. 14/941,551, filed Nov. 14, 2015, entitled "Layered Vector Architecture Compatibility For Cross-System Portability," which is a continuation of U.S. patent application Ser. No. 14/823,025, filed Aug. 11, 2015, entitled "Layered Vector Architecture Compatibility For Cross-System Portability," which is a non-provisional application of provisional application U.S. Ser. No. 62/036,741 entitled "Optimizing Vector Accesses On an Endian-Biased Multi-Endian Instruction Set Architecture," filed Aug. 13, 2014, each of which is hereby incorporated herein by reference in its entirety.

BACKGROUND

One or more aspects relate, in general, to processing within a computing environment, and, in particular, to the portability of programs across systems of different architectures.

Computer systems have evolved into sophisticated devices, and may be found in many different settings. Advances in both hardware and software (e.g., computer programs) have improved the performance of computer systems. Modern computer programs have become very complex when compared to early computer programs. Many modern computer programs have tens or hundreds of thousands of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. The way compilers generate instructions thus significantly affects the run-time performance of the code generated by the compiler.

To enhance performance of computer programs, vector programming may be employed that enables parallel processing. Vector programming often uses vector built-ins or intrinsics, which map to underlying hardware instructions. This approach, however, has limitations relating to, for instance, system portability of programs.

SUMMARY

Shortcomings of the prior art are overcome and additional advantages are provided through the provision of a computer-implemented method of mapping applications between processors of different system architectures. The computer-implemented method includes, for instance, obtaining, by a processor, program code that depends on vector element ordering. The program code is a part of an application that includes one or more intrinsics. The one or more intrinsics are mapped from a first system architecture for which the application was written to a second system architecture on which the application is to be executed. The first system architecture has a first instruction set architecture different from a second instruction set architecture of the second system architecture. The processor converts one or more operations of the program code included in the application having the one or more intrinsics mapped to the second system architecture from a first data layout to a second data layout. Based on the converting, the application is executable on the processor configured based on the second system architecture. A multi-layered approach is provided that facilitates portability of computer programs across systems of different architectures, thereby facilitating processing and improving performance. Computer programs may be transported from one system to another system without code inspection or modification and still correctly execute.

In one aspect, the processor further obtains a description of semantic operations of the one or more intrinsics of the first system architecture. The description is used to map the one or more intrinsics to emulated intrinsics of the second system architecture. Again, this facilitates the portability of computer programs across systems of different architectures.

In one example, the processor replaces the one or more intrinsics in the application with the emulated intrinsics obtained from the description. The replacing includes, for instance, translating a source file of the application having the one or more intrinsics to an internal representation for the second system architecture. The internal representation includes the emulated intrinsics. In another example, the replacing may include translating a source file of the application having the one or more intrinsics to an internal representation for the second system architecture. The internal representation includes substituted text for the emulated intrinsics.

As one example, the using of the description includes converting the description into a compiler internal language of the second system architecture. The compiler internal language has a data representation corresponding to a data representation of the first system architecture. Based on the compiler internal language, machine code in the second system architecture is generated.

In a further aspect, the processor converts the compiler internal language with the data representation of the first system architecture to the compiler internal language with the data representation of the second system architecture. This enables the program to be executed on a system configured for another system architecture. Machine code using the compiler internal language with the data representation of the second system architecture is generated.

In one embodiment, the processor optimizes the compiler internal language. This improves processing of the program, and thus, the computer system executing the program.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 12 depicts one example of defining processing rules for vector instructions that enforce a code generation endian preference, in accordance with an aspect of the present invention;

FIG. 13 depicts examples of vector instruction processing rules, in accordance with an aspect of the present invention;

DETAILED DESCRIPTION

Figure 1:
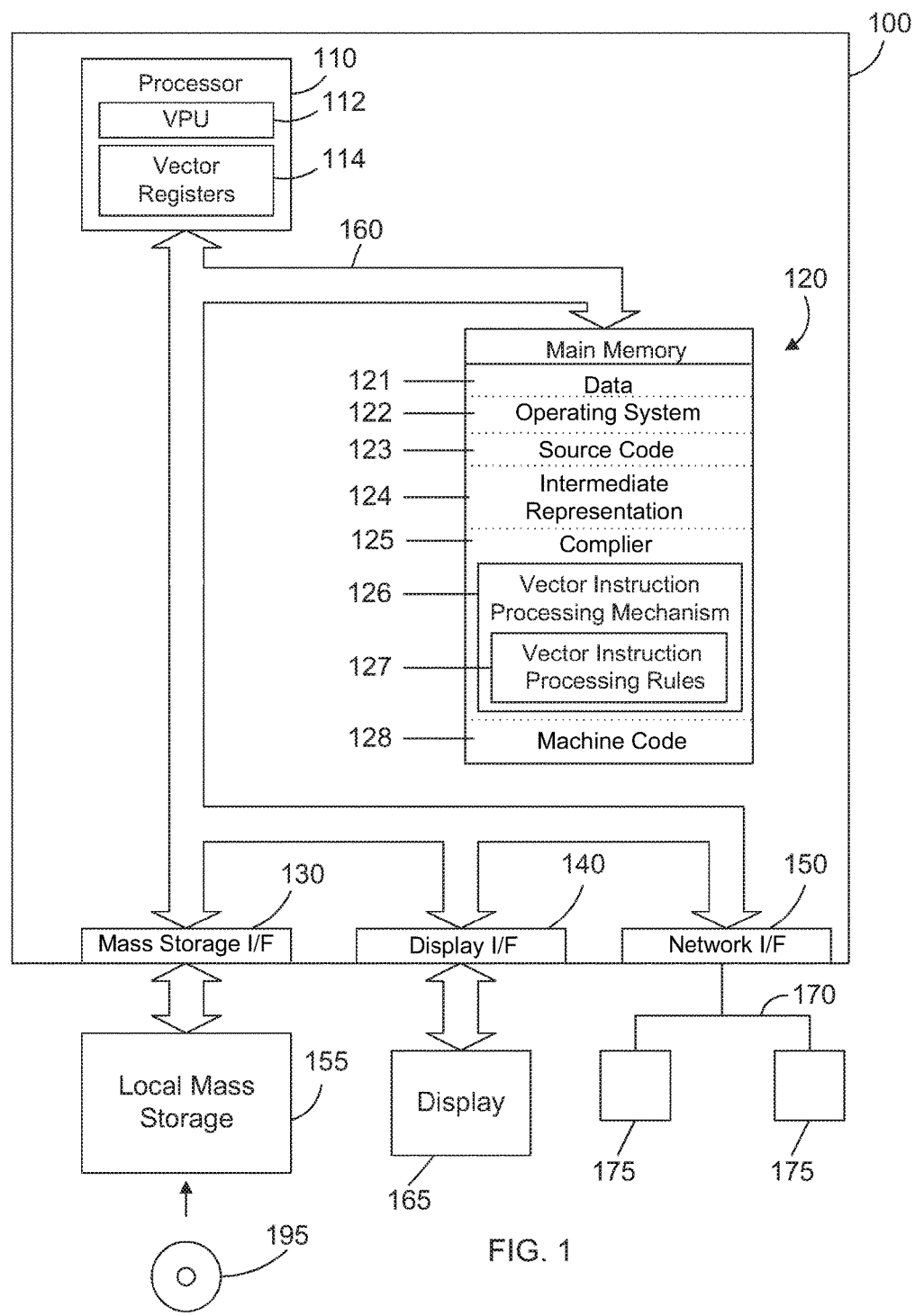
FIG. 1 depicts one embodiment of a computing environment to incorporate and/or use one or more aspects of the present invention.

In accordance with one or more aspects, a capability is provided to enable a program that includes intrinsics (also known as intrinsic functions, built-in functions or built-ins) defined in one architecture to execute without change on a different architecture. The architectures not only have differing instruction set architectures (ISAs), but may also have differing data layouts. For instance, one architecture may have a big endian data layout, while the other architecture may have a little endian data layout. Example architectures include, for instance, the Power architecture and the z/Architecture, offered by International Business Machines Corporation, Armonk, N.Y.; an Intel architecture; an ARM architecture; etc. Other possibilities exist.

Implementations of the Power architecture and the z/Architecture are described in "Power ISA™ Version 2.07B," International Business Machines Corporation, Apr. 9, 2015, and "z/Architecture Principles of Operation," IBM® Publication No. SA22-7832-10, Eleventh Edition, March 2015, respectively, each of which is hereby incorporated herein by reference in its entirety. IBM®, Z/ARCHITECTURE®, and POWER ARCHITECTURE® are registered trademarks of International Business Machines Corporation, Armonk, N.Y., USA. Other names used herein may be registered trademarks, trademarks, or product names of International Business Machines Corporation or other companies.

An intrinsic function is a function available for use in a given programming language whose implementation is specially handled by the compiler. Typically, it substitutes a sequence of automatically generated instructions for the original function call, similar to an inline function. Unlike an inline function though, the compiler has intimate knowledge of the intrinsic function and can therefore better integrate and optimize it for the situation. Intrinsic functions are often used to explicitly implement automatic vectorization and parallelization in languages which do not address such constructs. One example of an intrinsic function for an add operation is mm_add_ps. Many other examples exist.

Many computing systems, regardless of the architecture, take advantage of parallel computation. One of the most common opportunities for parallel computation arises when the same operation is to be performed on an array (or vector) of homogeneous data elements. Today's processor instruction set architectures usually include a set of single-instruction, multiple data (SIMD) instructions that can operate on 2, 4, 8, 16, or 32 values simultaneously. SIMD instructions are examples of what are more broadly termed vector instructions. For example, the Power instruction set architecture currently defines a Vector Add Single-Precision (vaddfp) instruction. This instruction operates on 128-bit vector registers, whose contents are interpreted as four 32-bit floating-point values. The corresponding values in each input register are added together and placed in the corresponding position in the output register. Thus, four additions are performed using a single instruction.

One example of a computer system to include and/or implement one or more aspects of the present invention is described with reference to FIG. 1. In one example, a server computer system 100 is based on the Power architecture, and is, for instance, a POWER8 or PowerPC computer system. However, one or more aspects equally apply to any computer system, regardless of whether the computer system is a complicated multi-user computing apparatus, a single user workstation, or an embedded control system.

Referring to FIG. 1, in one example, a computer system 100 includes one or more processors 110, a main memory 120, a mass storage interface (I/F) 130, a display interface 140, and a network interface 150. These system components are interconnected through the use of a system bus 160.

Main memory 120 includes, for instance, data 121, an operating system 122, source code 123, an intermediate representation 124, a compiler 125, and machine code 128. Data 121 represents any data that serves as input to or output from any program in computer system 100. Operating system 122 is a multitasking operating system. Source code 123, which is a high-level source code; intermediate representation 124, which is generated by a compiler (e.g., a front-end compiler) from source code 123; and machine code 128, which is generated by a compiler (e.g., a back-end compiler) from intermediate representation 124 are three different representations of a computer program.

Although source code 123, intermediate representation 124, compiler 125, and machine code 128 are all shown, for convenience, residing in memory 120 of one system, it will be appreciated that one or more of these components may reside and/or execute on one or more systems.

Mass storage interface 130 is used to connect mass storage devices, such as a local mass storage device 155, to computer system 100. One specific type of local mass storage device 155 is a readable and writable CD-RW (Compact Disk-Rewritable) drive, which may store data to and read data from a CD-RW disc 195.

Display interface 140 is used to directly connect one or more displays 165 to computer system 100. Displays 165 may be non-intelligent (i.e., dumb) terminals or fully programmable workstations, and are used to provide system administrators and users with the ability to communicate with computer system 100. However, while display interface 140 is provided to support communication with one or more displays 165, computer system 100 does not necessarily require a display 165, because all needed interaction with users and other processes may occur via, for instance, network interface 150.

Network interface 150 is used to connect computer system 100 to other computer systems or workstations 175 via, e.g., a network 170. Network interface 150 broadly represents any suitable way to interconnect electronic devices, regardless of whether network 170 includes present-day analog and/or digital techniques or via some networking mechanism of the future. Network interface 150 includes, for instance, a combination of hardware and software that allows communicating on network 170. Software in network interface 150, includes in one example, a communication manager that manages communication with other computer systems 175 via network 170 using a suitable network protocol. Many different network protocols may be used to implement a network. These protocols are specialized computer programs that allow computers to communicate across a network. TCP/IP (Transmission Control Protocol/Internet Protocol) is an example of a suitable network protocol that may be used by the communication manager within network interface 150. However, other protocols may be used.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 may include a vector processing unit (VPU) 112 and multiple vector registers 114. Vector Processing Unit 112 and vector registers 114 allow the processor to execute single-instruction multiple data (SIMD) instructions, which are examples of vector instructions. Although computer system 100 is shown to include only a single processor and a single system bus, in another embodiment, computer system 100 may include multiple processors and/or multiple buses.

Processor 110 may also execute compiler 125. In one embodiment, compiler 125 includes a vector instruction processing mechanism 126 that may employ one or more vector instruction processing rules 127 to generate instructions for vector instructions in a way that enforces an endian preference. Endianness refers to how the processor stores bytes of a multi-byte value in memory. For example, a 64-bit integer in a machine register contains 8 bytes, arranged from most-significant byte (MSB) containing the bits representing the largest portions of the integer, to the least-significant byte (LSB) containing the bits representing the smallest portions of the integer. On an architecture, referred to as a big endian (BE) architecture, the same value is stored in memory with byte 0 containing the MSB, and byte 7 containing the LSB. On an architecture, referred to as a little endian (LE) architecture, the value is stored in memory with byte 0 containing the LSB, and byte 7 containing the MSB.

Big endian and little endian systems typically view values differently in vector registers as well. When an array of four 32-bit values is loaded into a 128-bit big endian vector register, the zeroth element of the array occupies the most significant bytes, while for a little endian vector register, the third element of the array occupies the most significant bytes. These are considered to be the "natural element order" for big endian and little endian memory models. The contents of each 4-byte element are represented in the same fashion on both big endian and little endian architectures, with the sign bit of the floating-point value placed in the most significant bit of the element.

Some ISAs (PowerPC and ARM, for example) are designed to operate in either big endian mode or in little endian mode. Thus, the same instructions are available to carry out computations regardless of endianness. This is of no concern for instructions such as vaddfp, described above, where the computation is performed uniformly on all elements of the instruction's input and output registers. However, when an instruction implicitly or explicitly refers to the element numbering within a vector register, the numbering that is natural for one endianness is unnatural for the other.

In some cases, an ISA may provide instructions to facilitate maintaining elements in vectors using a particular element order, regardless of the endian mode specified by the programmer. For example, the Load VSX Vector Doubleword*2 Indexed (lxvd2x) instruction in the PowerPC ISA specifically loads elements into a vector register using the big endian natural element order, whether or not the machine is using the big endian memory model or the little endian memory model. Similarly, the Store VSX Vector Doubleword*2 Indexed (stxvd2x) instruction stores to memory as though the elements in the vector register use the big endian natural element order. Using these instructions allows a programmer to ignore, for a subset of data types and instructions, the actual endian memory model in use.

An instruction that regards vector elements in vector registers using a big endian natural element order is said to have a big endian vector element endian bias. Conversely, an instruction that regards vector elements in vector registers using a little endian natural element order is said to have a little endian vector element endian bias. When the preponderance of vector instructions in an ISA have the same endian bias, this is referred to as the inherent endian bias of the ISA.

In bi-endian systems, there is typically a bit in the processor that specifies which endian mode the processor is to run.

Figure 2:
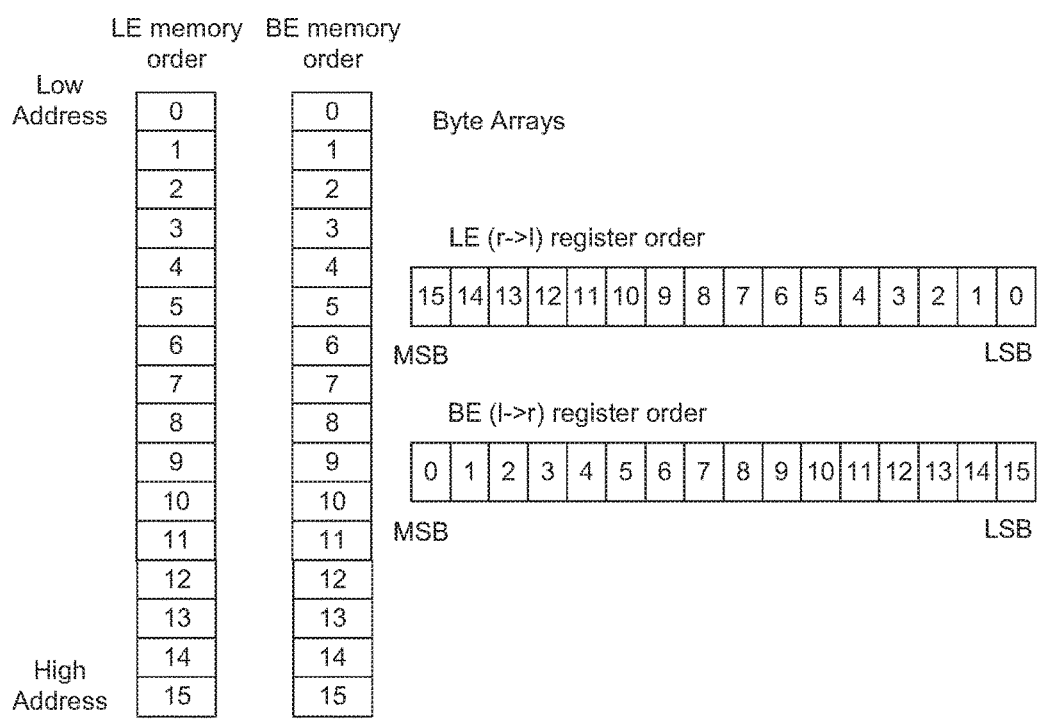
FIG. 2 depicts one example of byte arrays stored in a little endian format and a big endian format, in accordance with one or more aspects of the present invention.
Figure 3:
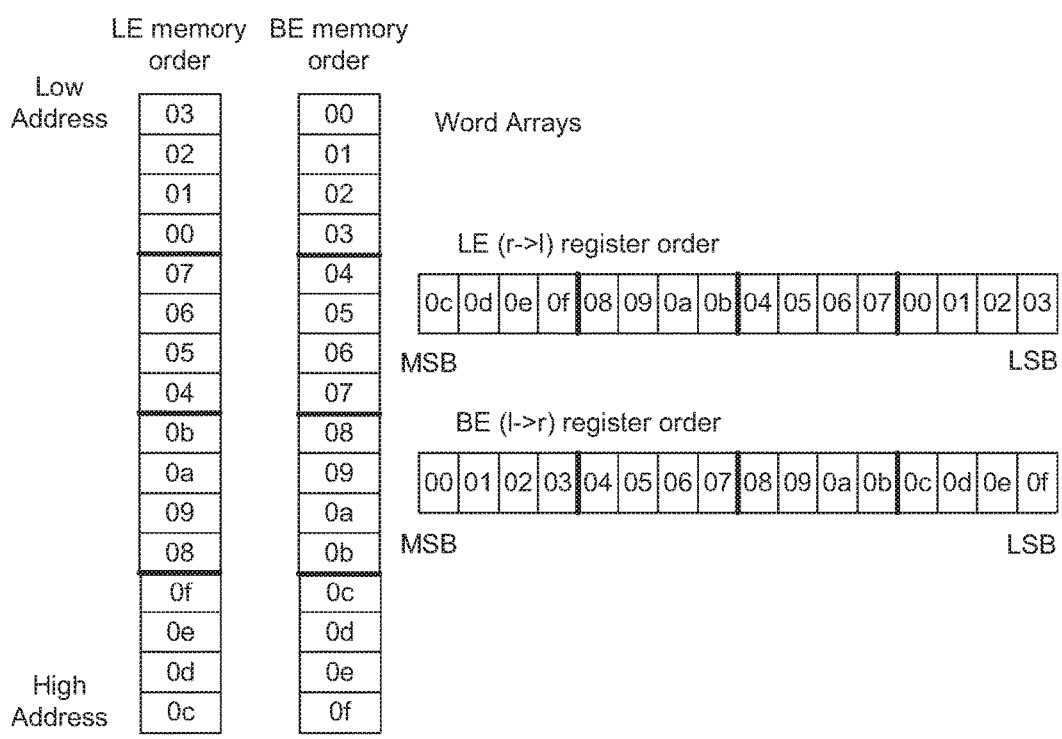
FIG. 3 depicts one example of word arrays stored in a little endian format and a big endian format, in accordance with one or more aspects of the present invention.

FIGS. 2 and 3 show examples of how data arrays may be represented in memory, using big endian and little endian data representations, and how they may be represented in vector registers, using left to right and right to left element ordering. In FIG. 2, an array of bytes containing {0, 1, . . . , 15} is shown. Since each vector element is one byte long, the little endian (LE) and big endian (BE) representations in memory are identical, with the first element stored in the lowest address. Using right to left element ordering (LE), the first element is stored in the least significant byte (LSB) of the vector register; while using left to right element ordering (BE), the first element is stored in the most significant byte (MSB).

FIG. 3 shows representations for an array of 4-byte integers, containing {0x00010203, 0x04050607, 0x08090a0b, 0x0c0d0e0f}. In memory, elements appear in ascending address order for both BE and LE, but the byte order within each element differs. In registers, the opposite is true: the elements appear from right to left using a right to left order (LE) and from left to right using a left to right order (BE), but within each element, the byte ordering is identical. Thus, the 4-byte integer stored in the least significant four bytes of the LE register are the same order, namely 00, 01, 02, 03, as the 4-byte integer stored in the most significant four bytes of the BE register. The order that changes is the order of elements, not the order of bytes within the elements.

Vector instruction processing mechanism 126, in accordance with one or more aspects, generates instructions for vector instructions in a way that ensures correct operation in a bi-endian environment, in which the processor architecture contains instructions with an inherent endian bias, along with at least one memory access instruction with a contrary endian bias. The compiler uses a code generation endian preference that matches the inherent computer system endian bias. When the compiler processes a computer program, it generates instructions for vector instructions by determining whether the vector instruction has an endian bias that matches the code generation endian preference. When the endian bias of the vector instruction matches the code generation endian preference, the compiler generates one or more instructions for a vector instruction, as it normally does. When the endian bias of the vector instruction does not match the code generation endian preference, the compiler generates instructions that include one or more vector element reverse instructions (vreverse) to correct the mismatch.

Figure 4A:
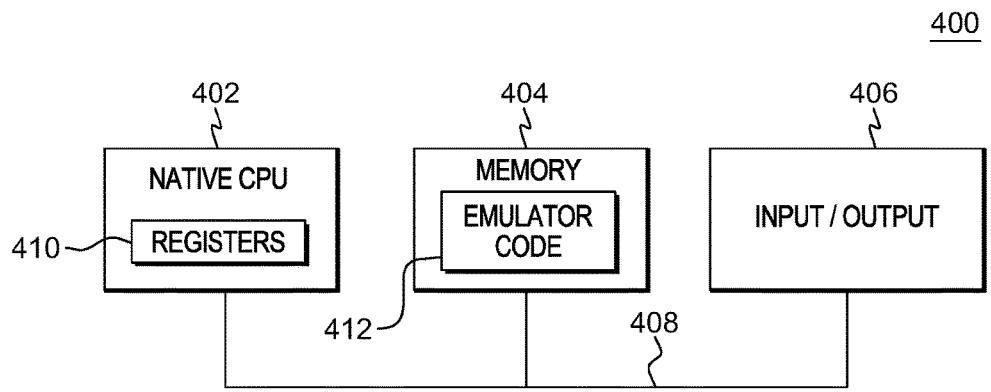
FIG. 4A depicts another example of a computing environment to incorporate and use one or more aspects of the present invention.

Another embodiment of a computing environment to incorporate and use one or more aspects of the present invention is described with reference to FIG. 4A. In this example, a computing environment 400 includes, for instance, a native central processing unit 402, a memory 404, and one or more input/output devices and/or interfaces 406 coupled to one another via, for example, one or more buses 408 and/or other connections. As examples, computing environment 400 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 402 includes one or more native registers 410, such as one or more general purpose registers and/or one or more special purpose registers used during processing within the environment. These registers include information that represent the state of the environment at any particular point in time.

Moreover, native central processing unit 402 executes instructions and code that are stored in memory 404. In one particular example, the central processing unit executes emulator code 412 stored in memory 404. This code enables the processing environment configured in one architecture to emulate another architecture. For instance, emulator code 412 allows machines based on architectures other than the Power architecture, such as zSeries servers, HP Superdome servers or others, to emulate the Power architecture and to execute software and instructions developed based on the Power architecture. In a further example, emulator code 412 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 4B:
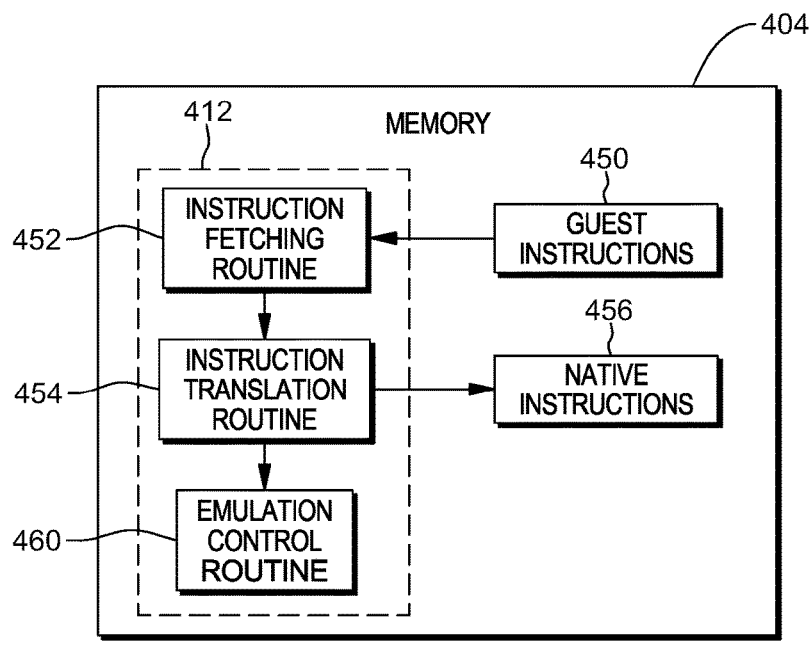
FIG. 4B depicts further details of the memory of FIG. 4A.

Further details relating to emulator code 412 are described with reference to FIG. 4B. Guest instructions 450 stored in memory 404 comprise software instructions (e.g., correlating to machine instructions) that were developed to be executed in an architecture other than that of native CPU 402. For example, guest instructions 450 may have been designed to execute on a PowerPC processor or a z/Architecture processor, but instead, are being emulated on native CPU 402, which may be, for example, an Intel Itanium II processor. In one example, emulator code 412 includes an instruction fetching routine 452 to obtain one or more guest instructions 450 from memory 404, and to optionally provide local buffering for the instructions obtained. It also includes an instruction translation routine 454 to determine the type of guest instruction that has been obtained and to translate the guest instruction into one or more corresponding native instructions 456. This translation includes, for instance, identifying the function to be performed by the guest instruction and choosing the native instruction(s) to perform that function.

Further, emulator code 412 includes an emulation control routine 460 to cause the native instructions to be executed. Emulation control routine 460 may cause native CPU 402 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 456 may include loading data into a register from memory 404; storing data back to memory from a register; or performing some type of arithmetic or logic operation, as determined by the translation routine.

Each routine is, for instance, implemented in software, which is stored in memory and executed by native central processing unit 402. In other examples, one or more of the routines or operations are implemented in firmware, hardware, software or some combination thereof. The registers of the emulated processor may be emulated using registers 410 of the native CPU or by using locations in memory 404. In embodiments, guest instructions 450, native instructions 456 and emulator code 412 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 450 that is obtained, translated and executed is an instruction described herein. The instruction, which is of one architecture (e.g., the Power architecture or z/Architecture) is fetched from memory, translated and represented as a sequence of native instructions 456 of another architecture (e.g., the z/Architecture, Power architecture, Intel architecture, etc.). These native instructions are then executed.

As indicated above, in accordance with one or more aspects, a capability is provided to enable a program (also referred to as a computer program or application) that includes intrinsics defined in one architecture to execute in a different architecture, including an architecture that has a different vector data layout (i.e., a different endianness). Today, vector programming often employs vector builtins or intrinsics, which depend on the use of pseudo-functions that commonly map 1:1 to underlying hardware instructions. Thus, a program written with vector builtins for, e.g., an Intel processor, may not be compiled to execute on the z/Architecture, Power architecture or ARM; and a program developed to use the ARM architecture intrinsics similarly cannot be executed on a System z server or a Power system, as examples.

Thus, software developers are forced to duplicate efforts for parallelizing code for multiple systems, or accept inferior system performance on some systems. Further, this limits a system architect's freedom to choose the proper system that is appropriate for a particular purpose.

The problem is further aggravated by different data layouts, such that some processors use a big endian data layout and other processors use a little endian data layout, as described above.

Thus, there is a need to be able to transport source code from one system (e.g., Power, ARM, System z, Intel, etc.) to another system (e.g., another of Power, ARM, System z, Intel, etc.) without code inspection or modification, and achieve correctly executable programs.

Therefore, in accordance with one or more aspects, a mapping of programs written for one architecture to another architecture is achieved using a two-level translation scheme. As an example, there are two layered translation components: an operation semantics component and a data representation component. The operation semantics component maps operations of a first system architecture (e.g., a first ISA) for which the program was developed to those of a second system architecture (e.g., a second ISA), but using the same vector layout. In one example, the first ISA has, for instance, a defined number of registers; a set of predefined instructions available for execution as implemented by the ISA; and/or detailed specifications of the operations, including any condition indications, etc., and the second ISA has, for instance, a defined number of registers; a set of predefined instructions available for execution as implemented by the ISA; and/or detailed specifications of the operations, including any condition indications, etc., one or more of which may be different from the first ISA.

The data representation component then converts between a first layout (e.g., a first vector data layout) and a second layout (e.g., a second vector data layout). This is further described with reference to FIG. 5.

Figure 5:
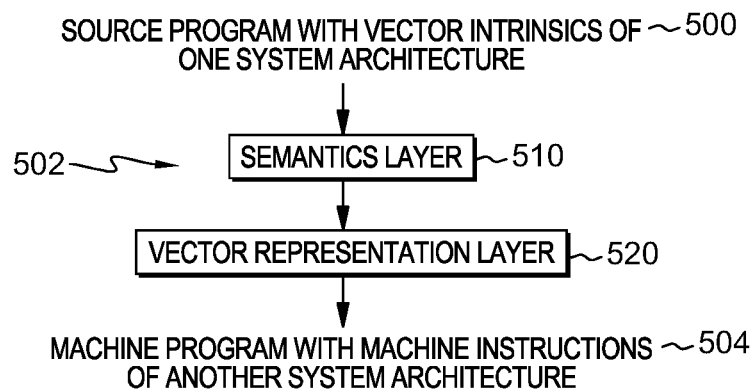
FIG. 5 depicts one embodiment of layered processing, in accordance with one or more aspects of the present invention.

Referring to FIG. 5, a source program with vector intrinsics of one system architecture (e.g., one ISA) 500 is input to a multi-layered translation scheme 502 to provide as an output a machine program with machine instructions of another system architecture (e.g., another ISA) 504. The multilevel layer includes, for instance, a semantics layer 510 and a vector representation layer 520.

Semantics layer 510 is used to translate the source code that includes the intrinsics in one instruction set architecture to an internal language (IL) of another instruction set architecture, but does not address the vector data layout. It remains that of the one instruction set architecture.

Vector representation layer 520 is then used to convert the vector data layout of the translated source code into a vector data layout of the other instruction set architecture. The vector representation layer produces a programmable interface that implements by way of compilation-based emulation techniques the same vector data layout as the architecture for which the source program was written with intrinsics, when the target architecture has a different vector layout.

In one embodiment, the intrinsics of a particular architecture are described in a source and that source may be used to emulate the intrinsics on a different architecture. One embodiment of logic associated with this processing is described with reference to FIG. 6. For convenience, in FIG. 6, and herein, the system configured in a first system architecture and employing a first vector data layout is referred to as System X, and the system configured in a second system architecture, different from the first system architecture, and employing a second vector data layout, different from the first vector data layout, is referred to as System Y.

Figure 6:
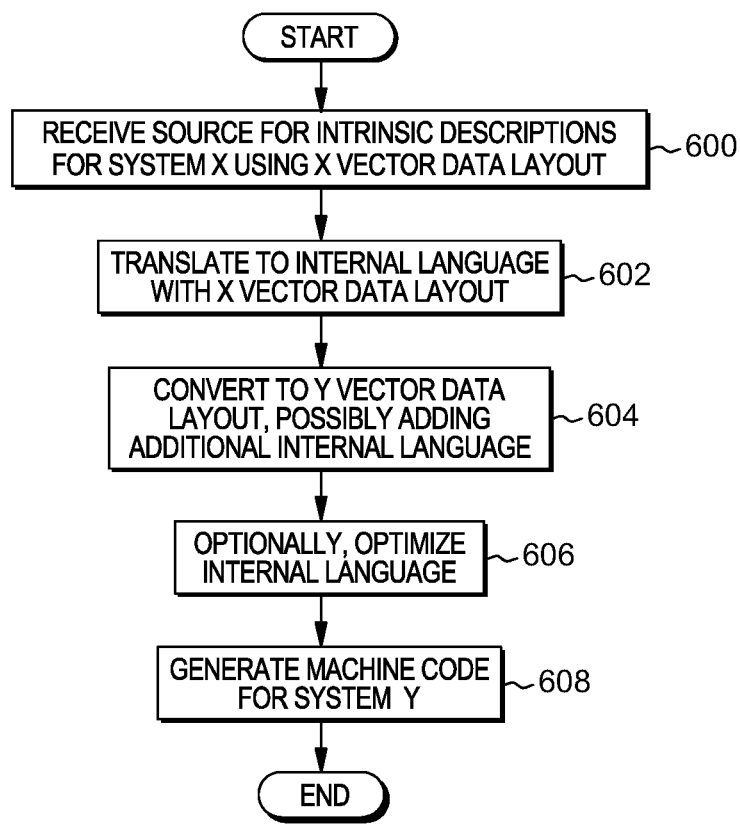
FIG. 6 depicts one embodiment of logic relating to using a source to emulate intrinsics used within a program, in accordance with one or more aspects of the present invention.

Referring to FIG. 6, initially, in one example, a System Y processor (e.g., a compiler executing on the processor) receives a source that includes intrinsic descriptions for System X, STEP 600. The intrinsic descriptions describe each intrinsic of System X (i.e., the function or operation of the intrinsic) and emulate each intrinsic by providing one or more instructions in a System Y format that perform the intrinsic. The descriptions, however, use a vector data layout compatible with System X.

The intrinsics are translated to an internal language, but still maintain the System X vector data layout, STEP 602. That is, the System Y compiler converts the description into a compiler internal language reflective of compiler Y, but with a data representation corresponding to the data vector representation of the architecture of system X.

As an example, the following intrinsic in the little-endian format:

```
num4 = __mm_add_ps(num4, num3);
may be converted into an internal representation:
LD R1, num4          # load num4 into register 1
LD R2, num3          # load num3 into register 2
VADDPS R1, R1, R2    # add parallel single precision register 2 onto
                       register 1
ST R1, num4          # store register 1 into num4
```

In this example, VADDPS is an LE vector add in accordance with a first, e.g., an LE (right to left) element ordering of a first system X, and System Y uses a second ordering, e.g., a left to right (BE) ordering.

Then, the compiler converts the internal description from the compiler internal language with a vector data representation corresponding to the vector data representation of the System X architecture to a compiler internal language with a vector data representation corresponding to the vector data representation of the System Y architecture, STEP 604. This converting may further include introducing one or more additional compiler internal language operations in order to map the data formats and numbering of a first data representation X to a second data representation Y.

Thus, for example, the above may be converted into the following representation using an internal language:

```
LD R1, num4      # load num4 into register 1
LD R2, num3      # load num3 into register 2
REVE R11, R1     # reverse element order from register 1 into register 11
REVE R12, R2     # reverse element order from register 2 into register 12
VADDFP R11,      # add parallel single precision register 12 onto register 11
R11, R12
REVE R1, R11     # reverse element order from register 11 into register 1
ST R1, num4      # store register 1 into num4
```

Optionally, the compiler optimizes the compiler internal language of the System Y vector data layout, STEP 606, and generates machine code for System Y, STEP 608. This machine code includes the one or more translated intrinsics and the converted vector data layout.

In one embodiment, this optimization can involve removing unnecessary element reorganizations, when doing so does not change the result, e.g.:

```
LD R11, num4     # load num4 into register 11
LD R12, num3     # load num3 into register 12
VADDFP R11,      # add parallel single precision register 12 onto register 11
R11, R12
ST R11, num4     # store register 11 into num4
```

In addition to receiving the source, the compiler may also receive (e.g., concurrently) source code of a computer program. The source code may include one or more specific vector intrinsics corresponding to vector intrinsics of System X. This processing is further described with reference to FIG. 7.

Figure 7:
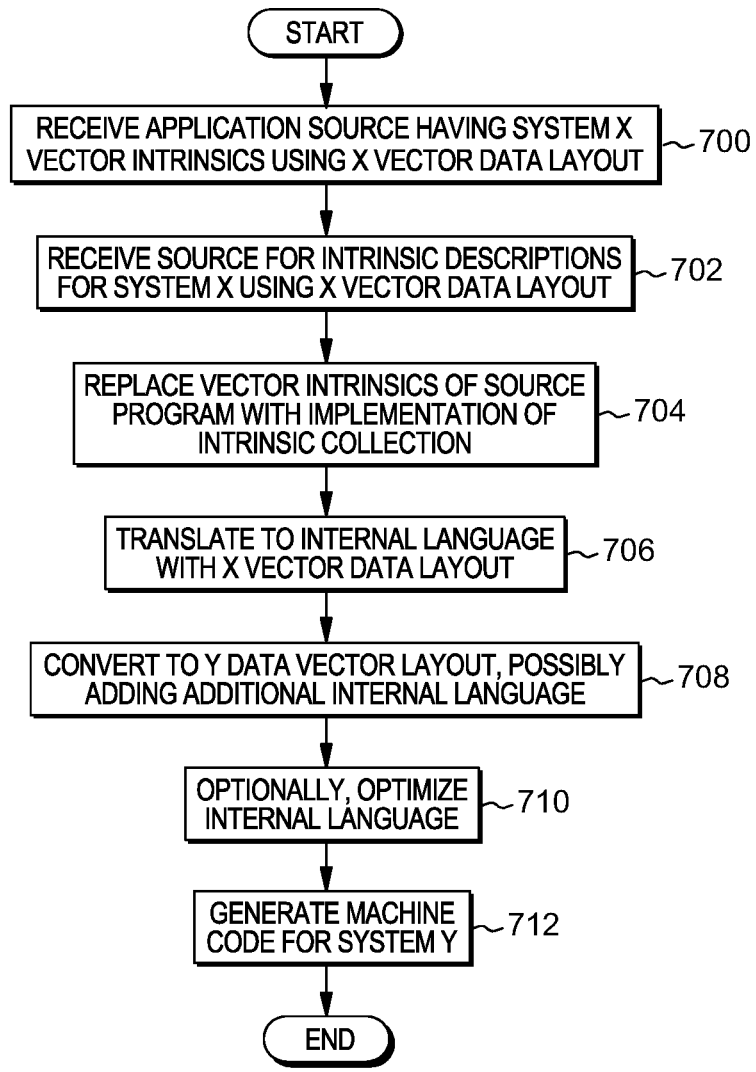
FIG. 7 depicts one embodiment of logic relating to layered processing of a computer program using intrinsics, in accordance with one or more aspects of the present invention.

Referring to FIG. 7, initially, the System Y processor (e.g., compiler) receives application source code having System X vector intrinsics and using a System X data layout, STEP 700. Additionally, as described above, the processor receives a source that includes intrinsic descriptions for the System X intrinsics using the System X data layout, STEP 702.

The vector intrinsics of the source program are then replaced with implementations of an intrinsic collection obtained, e.g., from the source for the intrinsic descriptions, STEP 704. The intrinsics of the source program are translated to an internal language, but still maintain the System X vector data layout, STEP 706. That is, the System Y compiler converts the source program into a compiler internal language reflective of compiler Y, but with a data representation corresponding to the data vector representation of the architecture of System X.

Then, the compiler converts the source program from the compiler internal language with a vector data representation corresponding to the vector data representation of the System X architecture to a compiler internal language with a vector data representation corresponding to the vector data representation of the System Y architecture, STEP 708. This converting may further include introducing one or more additional compiler internal language operations in order to map the data formats and numbering of a first data representation X to a second data representation Y.

Optionally, the compiler optimizes the compiler internal language of the System Y vector data layout, STEP 710, and generates machine code for System Y, STEP 712. This machine code includes the one or more translated intrinsics and the converted vector data layout.

In one implementation of STEP 704, the description of the intrinsics may be built into the compiler, such that the compiler understands the intrinsics and is able to emulate those intrinsics. However, in another embodiment, an approach is used in which the compiler does not understand the intrinsics, but instead, relies on provided information (e.g., a header file) that provides the names of the intrinsics and indicates the one or more instructions to be executed based on encountering a particular intrinsic name. An implementation that uses header files in emulating intrinsics is described with reference to FIG. 8.

Figure 8:
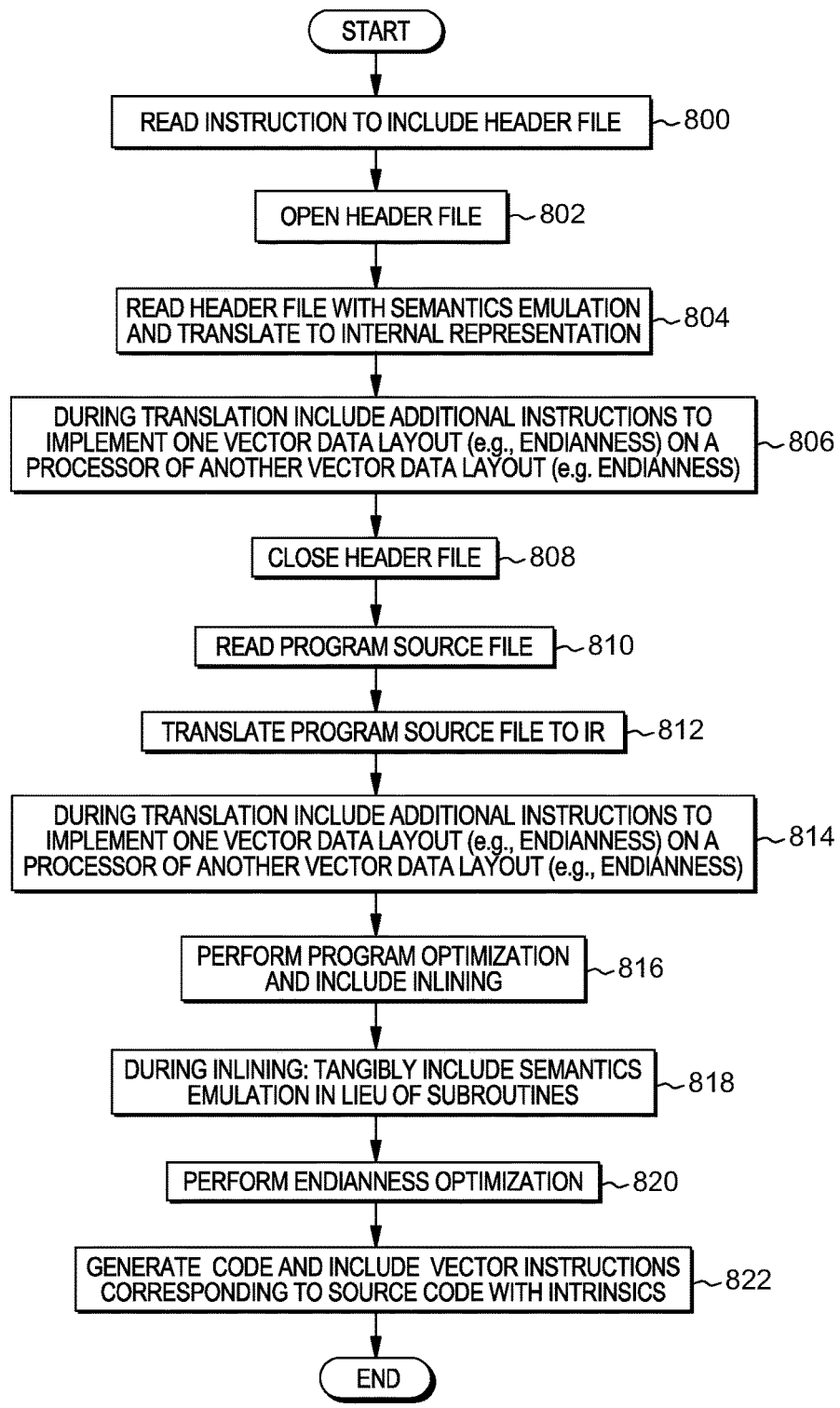
FIG. 8 depicts one embodiment of logic relating to layered processing and the use of header files, in accordance with one or more aspects of the present invention.

Referring to FIG. 8, initially, the System Y processor (e.g., a compiler) executes a System X source program and reads an instruction that indicates there is a header file (e.g., #include <headerfilename.h>), STEP 800. The header file describes the intrinsics of the System X architecture, and based on reaching the #include <headerfilename.h>, it directs the processor to read the header file to obtain an understanding of the intrinsics. The header file is opened, STEP 802, and read to determine how to emulate the intrinsics and to translate the vector intrinsics to an internal representation for the System Y architecture, STEP 804. During translation, in one embodiment, additional instructions are included to implement one vector data layout (e.g., endianness) on a processor of another vector data layout (e.g., endianness), STEP 806. Thereafter, the header file is closed, STEP 808.

The program source file is then read, STEP 810, and translated to an internal representation, STEP 812. In one embodiment, the intrinsics of System X are represented in the internal representation as subroutines in the System Y architecture. Further, during translation, additional instructions are included in the translated internal representation to implement one vector data layout (e.g., endiannes) on a processor of another vector data layout (e.g., endianness), STEP 814.

Optionally, program optimization is performed, including inlining, STEP 816. During inlining, the intrinsics are replaced by emulated semantics to emulate the behavior of the intrinsics, in lieu of a call to a subroutine, STEP 818. Further, optionally, endianness optimization is performed, STEP 820.

Moreover, System Y machine code is generated from the internal representation, which includes emulated vector instructions corresponding to the source code with intrinsics, STEP 822.

For example, there are provided descriptions of intrinsics of, for instance, a system based on a first architecture (e.g., System X) that are to be represented based on a second architecture (e.g., System Y), in this case an IBM representation based on the Power ISA.

```
/* Add 4 32-bit ints */
__m128i __mm_add_epi32 (__m128i left, __m128i right)
{ return (__m128i) vec_add ((vector signed int) left,
(vector signed int) right);}
/* Unpack 4+4 16-bit shorts from low halves and interleave */
__m128i __mm_unpacklo_epi16 (__m128i left, __m128i right)
```

```
{
static const vector unsigned char permute_selector = {
0x18, 0x19, 0x08, 0x09, 0x1A, 0x1B, 0x0A, 0x0B, 0x1C, 0x1D,
0x0C, 0x0D, 0x1E, 0x1F, 0x0E, 0x0F
    }; /* define permute control to extract and interleave low half
    elements */
    /* extract right input bytes 8 and 9, left input bytes 8 and 9, right bytes
    10 and 11, left bytes 10 and 11, right bytes 12 and 13, left bytes 12
    and 13, right bytes 14 and 15, and finally left bytes 14 and 15 into
    output bytes 0 to 15 */
        return vec_perm (left, right, permute_selector); /* permute */
    }
```

In at least one embodiment, the _m128i data type refers to the System X data type system for vector intrinsics nd has been defined for a System Y system (e.g., an IBM Power system with at least one of the VMX and VSX SIMD instruction groups) to store a 16 byte data item, e.g., typedef vector unsigned char _m128i.

In at least one embodiment, intrinsics starting with the prefix _mm_ correspond to intrinsics of System X that are being emulated, whereas operations starting vec_ represent operations of the target system, System Y, used to emulate the System X intrinsics.

In a further embodiment, a programmer can specify how to replace text in an input file with other text in an output file. In one example, the programming language automatically performs that substitution, so instead of using the compiler to replace the vector intrinsics by way of inlining with the emulated behavior, source text is used. One example of an alternate embodiment of layered processing using text replacement is described with reference to FIG. 9.

Figure 9:
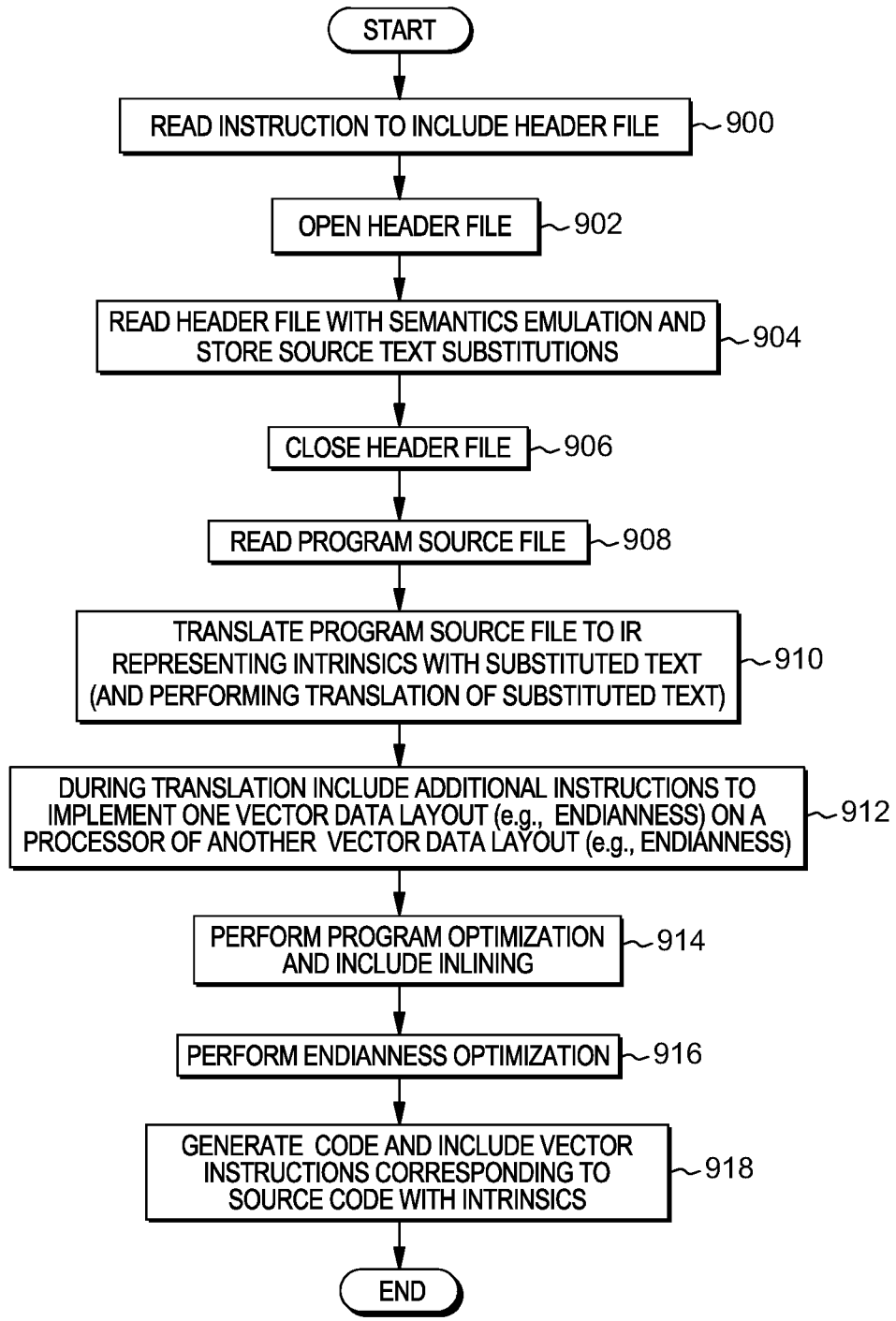
FIG. 9 depicts another embodiment of logic relating to layered processing and the use of header files, in accordance with one or more aspects of the present invention.

Referring to FIG. 9, initially, the System Y processor (e.g., compiler) reads an instruction within a System X computer program that indicates there is a header file, STEP 900. The header file is opened, STEP 902, and read, which includes semantics emulation, STEP 904. Source text substitutions for the emulated intrinsics are stored. The header file is then closed, STEP 906.

The program source file is then read, STEP 908, and translated to an internal representation representing intrinsics with substituted text and performing translation of substituted text, STEP 910. During translation, additional instructions are included in the translated internal representation to implement one vector data layout (e.g., endianness) on a processor of another vector data layout (e.g., endianness), STEP 912.

Optionally, program optimization is performed, including inlining, STEP 914. Further, optionally, endianness optimization is performed, STEP 916. System Y machine code is generated from the internal representation, which includes emulated vector instructions corresponding to the source code with intrinsics, STEP 918.

In at least one embodiment, the above may be accomplished using C preprocessor macros defined via the C preprocessor facility. In another embodiment, another preprocessor facility may be used, e.g., the m4 preprocessor. Other examples also exist.

As a particular example:

```
/* Add 4 32-bit ints */
#define _add_epi32 (left, right) \
((_m128i) vec_add((vector signed int) (let), (vector signed int) (right)))
/* Unpack 4+4 16-bit shorts from low halves and interleave */
#define _mm_unpacklo_epi16 (left, right)\
(_m128i) vec_perm ((left), (right), (vector unsigned char)(0x18, 0x19,
0x09, 0x1A, 0x1B, 0x0A, 0x0B, 0x1C, 0x1D, 0x1E, 0x1F, 0x0E, 0x0F)))
```

As described above, a two layered approach is provided that first emulates the semantics of a program providing a program with intrinsics that can run on a different architecture than the architecture for which the program was written, and then emulates the vector data layout of the program to another data layout. Further details relating to emulating the vector data layout are described with reference to FIG. 10.

Figure 10:
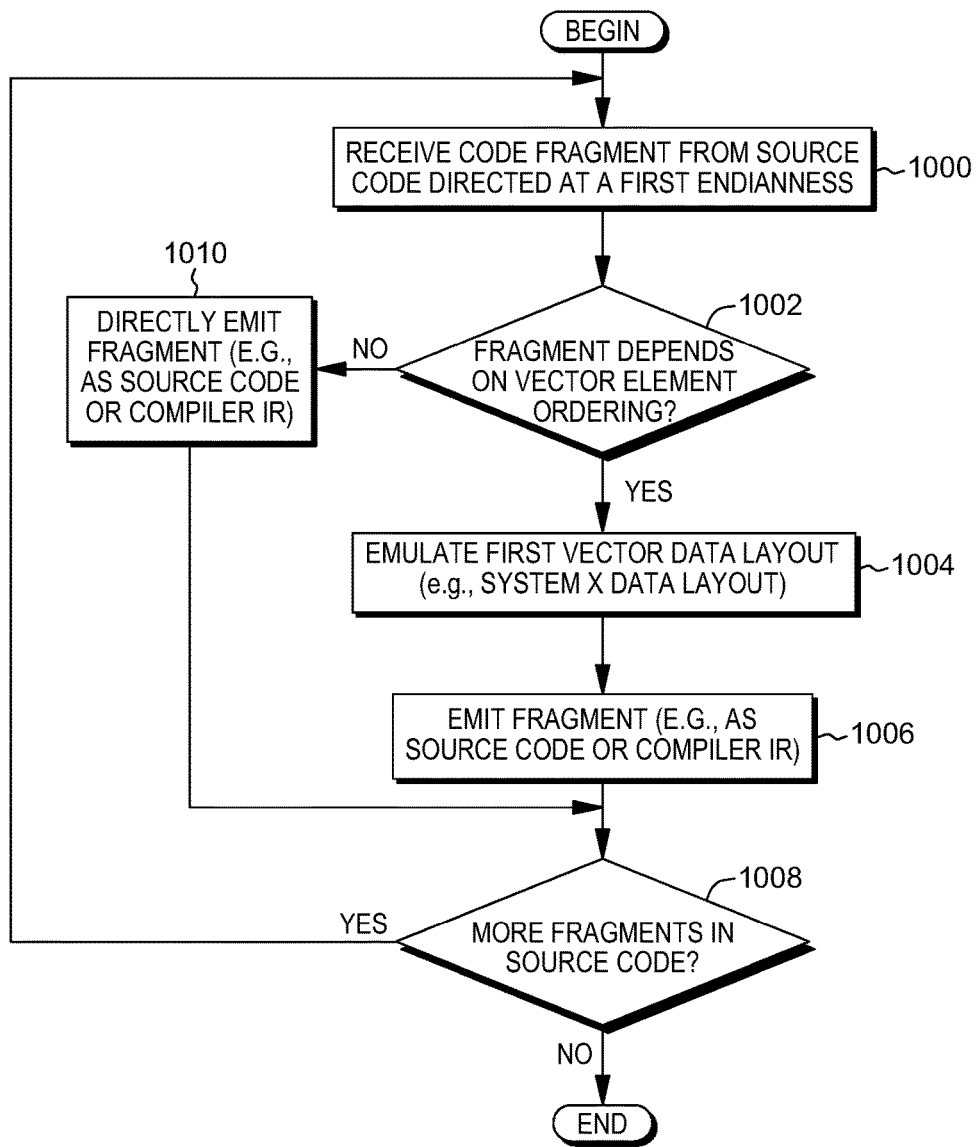
FIG. 10 depicts one example of logic associated with processing a code fragment that depends on vector element ordering, in accordance with an aspect of the present invention.

Referring to FIG. 10, one embodiment of logic relating to vector layering representation is described. In this example, cross-endian mapping is inserted in a distinct layer external to the compiler (e.g., source code or a compiler internal representation). Initially, the System Y processor (e.g., compiler) receives a code fragment from source code directed to a first vector data layout (e.g., first endianness; also referred to as System X endianness), STEP 1000. Thereafter, a determination is made as to whether the fragment depends on vector element ordering (e.g., does it include one or more instructions that use vector element ordering), INQUIRY 1002. If the fragment does depend on vector element ordering, then in one example, the first vector data layout is emulated using the endianness of System Y (i.e., a second vector data layout) by replacing the fragment with an equivalent fragment implementing endian operations with System Y endian numbering, STEP 1004. The fragment is then emitted as, for instance, a source code or compiler internal representation, STEP 1006.

A determination is made as to whether there are more fragments in the source code, INQUIRY 1008. If not, then processing is complete. Otherwise, processing continues to STEP 1000.

Returning to INQUIRY 1002, if the fragment does not depend on vector element ordering, then the fragment is directly emitted as, for instance, source code or a compiler internal representation, STEP 1010. Processing then continues to INQUIRY 1008.

Figure 11:
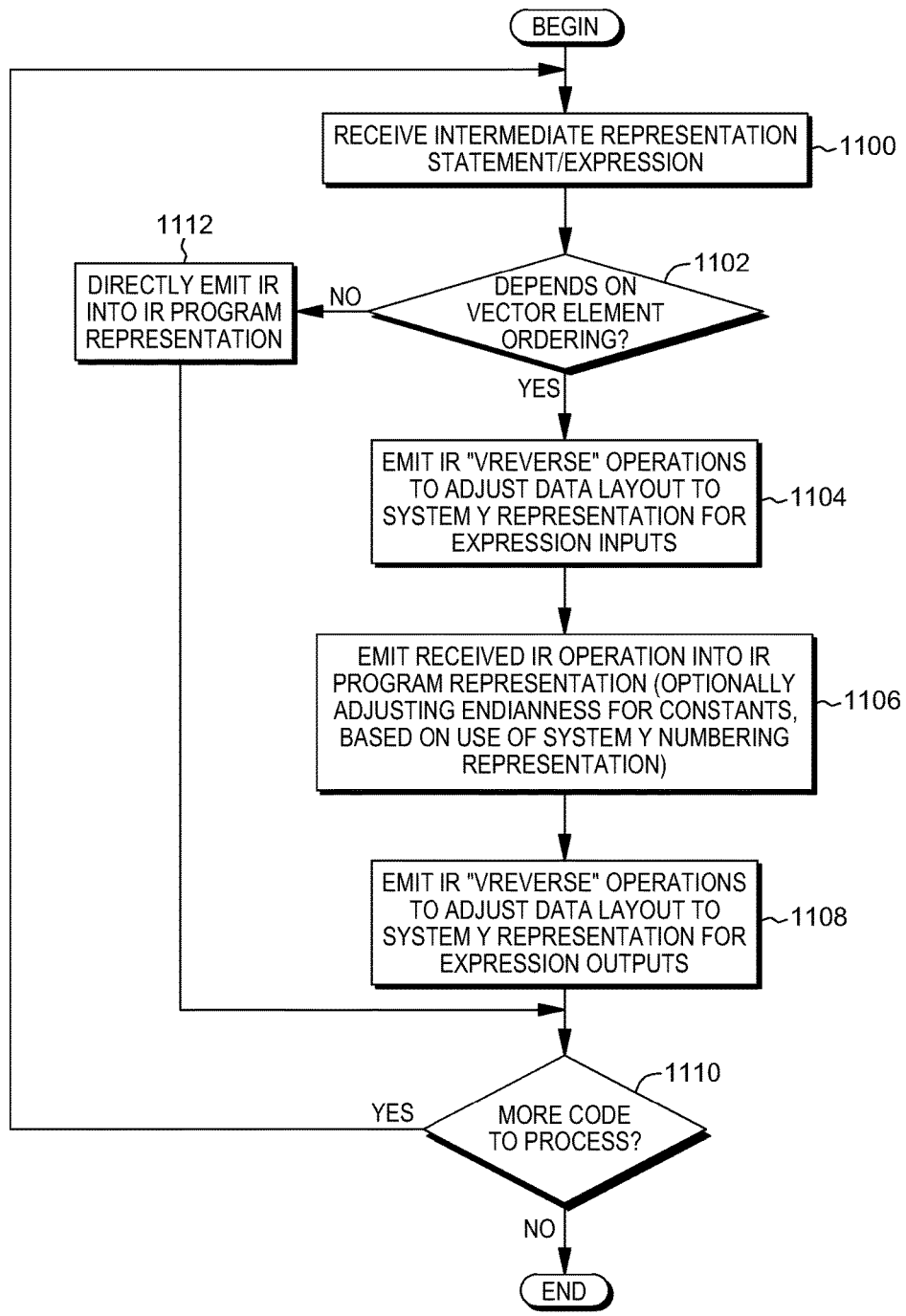
FIG. 11 depicts another example of logic associated with processing of code that depends on vector element ordering, in accordance with an aspect of the present invention.

Another implementation relating to emulating endianness is described with reference to FIG. 11. In this embodiment, the cross-endian mapping is inserted in the compiler at the time of internal representation generation. Referring to FIG. 11, initially, the System Y processor (e.g., compiler) receives an intermediate representation statement/expression, STEP 1100. A determination is made as to whether the statement/expression depends on vector element ordering, STEP 1102. If there is a dependence on vector element ordering, then one or more internal representation vreverse operations, described below, are emitted to adjust the data layout to System Y representations for the expression inputs, STEP 1104. The received internal representation operation is emitted into an internal representation program representation, optionally adjusting from System X to System Y endianness for constants, based on use of the appropriate numbering representation, STEP 1106.

The internal representation vreverse operations are emitted to adjust the data layout to the System Y representation for expression outputs, STEP 1108. Thereafter, a determination is made as to whether there is more code to process, INQUIRY 1110. If there is more code to process, then processing continues to STEP 1100. Otherwise, processing is complete.

Returning to INQUIRY 1102, if the statement/expression does not depend on vector element ordering, then an internal representation is directly emitted into an IR program representation, STEP 1112. Thereafter, processing continues to INQUIRY 1110.

Thus, for example, a vector add, t=vaddfp(s1,s2), which performs an addition of corresponding elements regardless of element ordering may be emitted directly as:

VADDFP RT, RS1, RS2 into an internal representation. Descriptions of known translation techniques for generating internal representations of source programs are described in known publications, such as in "Compilers: Principles, Techniques, and Tools," 1st Edition by Alfred V. Aho et al., Addison Wesley, Jan. 1, 1986.

Conversely, when an intrinsic is to be emitted into the CIL, in which the order of elements is to be adjusted, in accordance with an aspect of the present invention, a compiler may emit operations to adjust each input to a computation being dependent upon a vector data layout, such as a vector intrinsic corresponding to one or more CIL operations, followed by operations to adjust one or more outputs of the computation which is dependent upon a vector data layout, when the output of the layout dependent operation is also layout dependent.

In one embodiment, to address a mismatch in endianness, rules are provided, as described with reference to FIG. 12. Referring to FIG. 12, one or more vector instruction processing rules 127 are defined that enforce the code generation endian preference, STEP 1200. Examples of vector processing instruction rules 127 are depicted in FIG. 13. As examples, the rules include:

For all intermediate-representation instructions that specify an element number, generate machine instruction(s) that change the element number, 1310.

For all intermediate-representation instructions that specify odd or even element numbers, generate machine instruction(s) using odd element numbers instead of even element numbers, and even element numbers instead of odd element numbers, 1320.

For all intermediate-representation instructions that generate one or more load instructions, insert a vreverse instruction after each load, 1330

For all intermediate-representation instructions that generate one or more store instructions, insert a vreverse instruction before each store, 1340.

For all intermediate-representation instructions that have input arguments that are to be treated as an extended vector, generate instructions with input arguments in reverse order, 1350.

For all intermediate-representation instructions that reference "high half" or "low half" of a vector, generate opposite instructions referencing "low half" or "high half", 1360.

Figure 14:
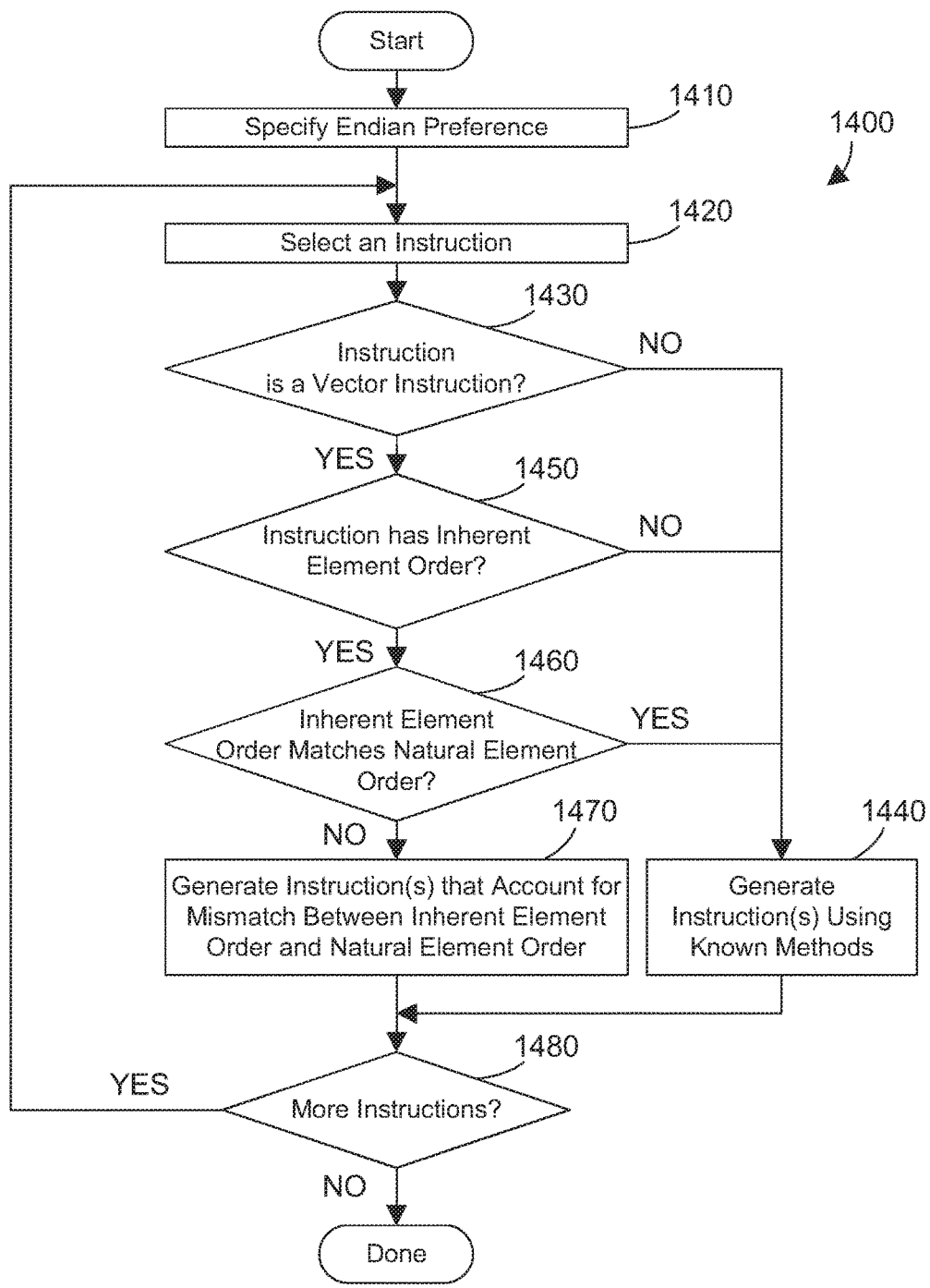
FIG. 14 depicts one example of logic for a compiler to process instructions based on a code generation endian preference according to the defined vector instruction processing rules shown in FIG. 13, in accordance with an aspect of the present invention.

Further details of one embodiment of bridging endianness are described with reference to FIG. 14. In FIG. 14, one embodiment of logic 1400 performed by a compiler (e.g., a compiler of System Y) is described. In one example, the compiler's code generation endian preference is set to the endian bias of the target instruction set architecture (e.g., System Y), STEP 1410. In one specific implementation, this is performed by a user setting a switch in the compiler. Other implementations are also possible.

The compiler now begins processing instructions. An instruction is selected, STEP 1420. When the selected instruction is not a vector instruction, INQUIRY 1430=NO, one or more instructions are generated for the selected instruction using known methods, STEP 1440. As used herein, a vector instruction includes any instruction that reads from or writes to a vector register. Suitable examples of vector instructions include single-instruction multiple data (SIMD) instructions. Because all other instructions that are not vector instructions do not operate on vector registers, the compiler can generate the corresponding instructions for these instructions as has been done using known techniques, STEP 1440. Processing continues to INQUIRY 1480.

Returning to INQUIRY 1430, when the selected instruction is a vector instruction, INQUIRY 1430=YES, but the instruction does not have an inherent element order (e.g., does not generate a vector load or store, and does not refer to specific elements or groups of elements), INQUIRY 1450=NO, the compiler generates instructions for the selected instruction using known methods, STEP 1440. When the selected instruction generates a vector load or store (i.e., has an inherent element order) or refers to specific elements or groups of elements, INQUIRY 1450=YES, and when the endian bias of the selected instruction matches the code generation endian preference, INQUIRY 1460=YES, the compiler generates instructions for the selected instruction using known methods, STEP 1440. When the endian bias of the selected instruction does not match the code generation endian preference, INQUIRY 1460=NO, instructions for the selected instruction are generated that account for the mismatch between the inherent element order and the natural element order, STEP 1470. For instance, one or more vector element reverse instructions are inserted to address the mismatch between the code generation endian preference and the endian bias of the instruction. This may be done by adding a vector element reverse instruction after each vector load instruction and by adding a vector element reverse instruction before each vector store instruction. When there are more instructions to process, INQUIRY 1480=YES, method 1400 loops back to STEP 1420 and continues until there are no more instructions to process, INQUIRY 1480=NO, at which point method 1400 is complete.

Figure 15A:
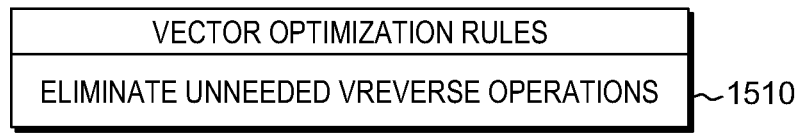
FIG. 15A depicts one example of vector optimization rules, in accordance with one or more aspects of the present invention.

Optionally, the processing relating to endianness may be optimized. One example of a vector optimization rule is described with reference to FIG. 15A. As an example, for all vector copy operations, unneeded vector element reverse (vreverse) operations in the intermediate representation are eliminated, STEP 1510.

Figure 15B:
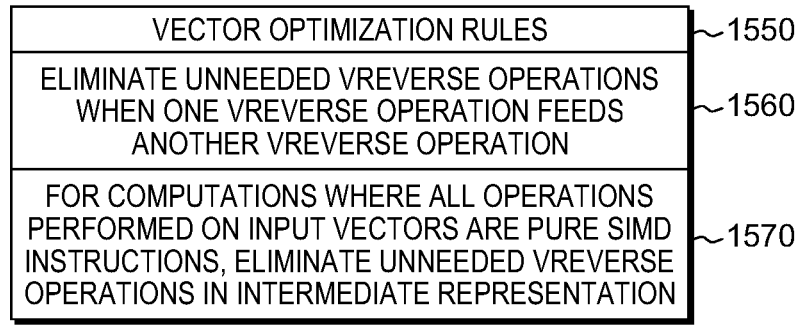
FIG. 15B depicts another example of vector optimization rules, in accordance with one or more aspects of the present invention.

Another example of vector optimization rules is described with reference to FIG. 15B. Referring to FIG. 15B, vector optimization rules 1550 include, for instance: eliminate unneeded vreverse operations when one vreverse operation feeds another vreverse operation, 1560; and for computations where all operations performed on input vectors are pure SIMD instructions, eliminate unneeded vreverse operations in the intermediate representation, 1570. The elimination of unneeded vreverse operations is described in further detail below.

In one embodiment, a compiler mitigates the performance cost of added vector element reverse operations, such as vector element reverse operations added by the compiler after vector load instructions and before vector store instructions. As used herein, any vector load instruction (whether biased-endian like "lxvd2x", or natural-endian like "lvx") is referred to as a vload, and similarly any vector store instruction is referred to as a vstore. Further, any operation that reverses the elements of a vector register is referred to as a vreverse, and an instruction that copies the contents of one register into another is referred to as a vcopy.

A "vreverse operation" generally refers to a series of one or more instructions that reverses the order of elements in a vector register. There are different vreverse operations for each element size (1 byte, 2 bytes, 4 bytes, 8 bytes, 16 bytes, etc.). An ISA may, but need not to, include machine instructions that map directly to vreverse operations of every size. Alternatively, more general instructions (such as permutes or shuffles) may be used instead.

In one implementation, there are different vector element reverse instructions for each different element size that can be specified in an instruction set. Thus, if a system defines vectors with element sizes of bytes, halfwords (2 bytes), words (4 bytes) and doublewords (8 bytes), there will be a different vector element reverse instruction for each of these. For example, a byte vector element reverse instruction could be vreverse. A halfword vector element reverse instruction could be vreverse_hw. A word vector element reverse instruction could be vreverse_w. A doubleword vector element reverse instruction could be vreverse_dw. Of course, any suitable syntax could be used, and any suitable number of vector element reverse instructions could be defined, depending on the element sizes defined by the instruction set, whether currently known or developed in the future. For example, a quadword vector element reverse instruction could be defined and vector element reverse instructions for elements larger than quadwords could also be defined. For the simplicity of the examples herein, the size of the vector element reverse instruction is not specified, realizing that the size could vary as described herein.

The compiler optimizations may be performed during any appropriate stage of the compilation process in order to eliminate one or more vreverse operations in the code. A compiler operates on one or more intermediate representations of code, which may be organized in various ways that may be more or less appropriate to a particular optimization. For example, an intermediate representation may represent expressions in a tree or directed-acyclic graph (DAG) form, or may use a variant of three-address code. Of course, many more variations are possible, whether currently known or developed in the future.

In the simplest case, it is common for a vector to be copied from one memory location to another, such as shown below:

(1) vector signed long a, b;

. . .

a=b;

Using various techniques, the compiler could generate for the code above, the following:

(2)

| | |
|---|---|
| vload t1 = a | # load a into register t1, using BE element order |
| vreverse t2 = t1 | # permute register t1 into t2 to reverse element order |
| vreverse t3 = t2 | # permute register t2 into t3 to reverse element order |
| vstore b = t3 | # store register t3 into b, using BE element order | where t1, t2, and t3 are vector registers. The effect of each vreverse is to reverse the order of the elements in the vector register. For this example, the vreverse t2=t1 instruction was added by the compiler to reverse the order of the vector elements after the vload t1=a instruction, and the vreverse t3=t2 instruction was added by the compiler to reverse the order of the vector elements before the vstore b=t3 instruction. Thus, the first vreverse reverses the elements, and the second vreverse restores them to their original locations. If the value of t2 is not used anywhere else, the compiler may replace the instructions of (2) with the following instructions:

(3)

| | |
|---|---|
| vload t1 = a | # load a into register t1, using BE element order |
| vcopy t3 = t1 | # copy register t1 into t3 |
| vstore b = t3 | # store register t3 into b, using BE element order |

Then, standard compiler optimizations, known as copy propagation and/or value numbering, can reduce the instructions at (3) to the following instructions:

(4)

| | |
|---|---|
| vload t = a | # load a into register t, using BE element order |
| vstore b = t | # store register t into b, using BE element order |

Note that the vreverse operations have been removed, so there is now no performance penalty.

More specifically, a compiler performing an example translation of the code of (1) described in conjunction with these rules may generate assembly code corresponding to (2) for a little endian environment in accordance with the instructions for POWER8 as follows:

| | |
|---|---|
| lxvd2x 0,0,4 | # load into vector register 0, using BE element order |
| xxpermdi 0,0,0,2 | # permute vector register 0 to reverse element order |
| xxpermdi 0,0,0,2 | # permute vector register 0 to reverse element order |
| stxvd2x 0,0,3 | # store vector register 0, using BE element order |

In accordance with one example implementation, when the optimizations described herein are performed, a compiler may generate code corresponding to (4) for a little endian environment in accordance with the POWER8 instruction set as follows:

| | |
|---|---|
| lxvd2x 0,0,4 | # load into vector register 0, using BE element order |
| stxvd2x 0,0,3 | # store vector register 0, using BE element order |

Note that a code sequence where one vreverse operation feeds another vreverse operation for elements of the same size can arise in other contexts than a vector copy. For example, the optimization rules in FIG. 15B may introduce such a code sequence. At any time such a code sequence is introduced, every use of the result of the second vreverse operation may be replaced with the input to the first vreverse operation, and the second vreverse operation may be removed. If the result of the first vreverse operation is not used elsewhere, it may also be removed.

As described herein, a layered approach is provided that enables a program including vector intrinsics from one architecture to be run without change on another architecture having a different data layout.

Figure 16A:
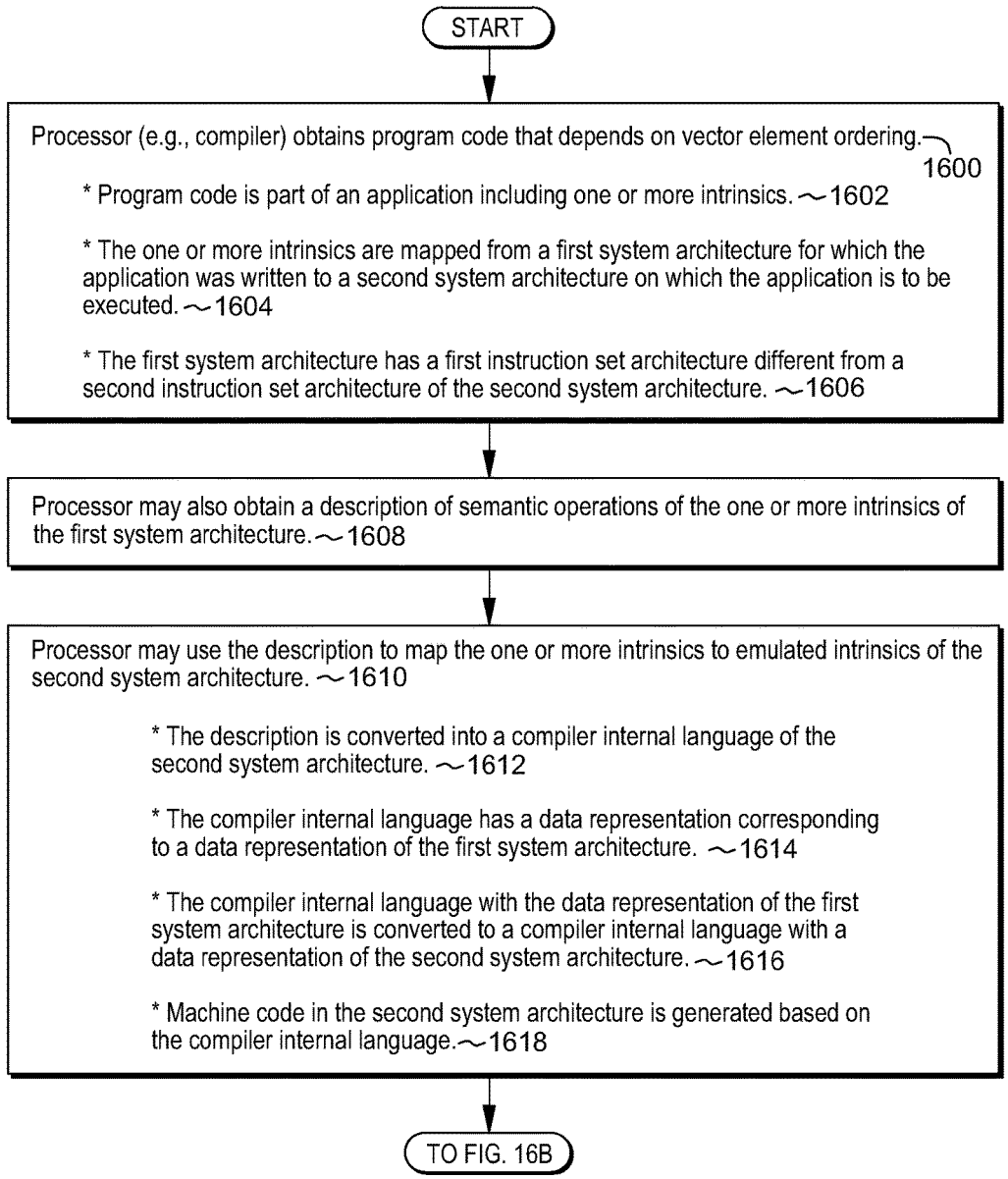
FIGS. 16A-16B depict one example of logic to map applications between processors of different system architectures, in accordance with one or more aspects.
Figure 16B:
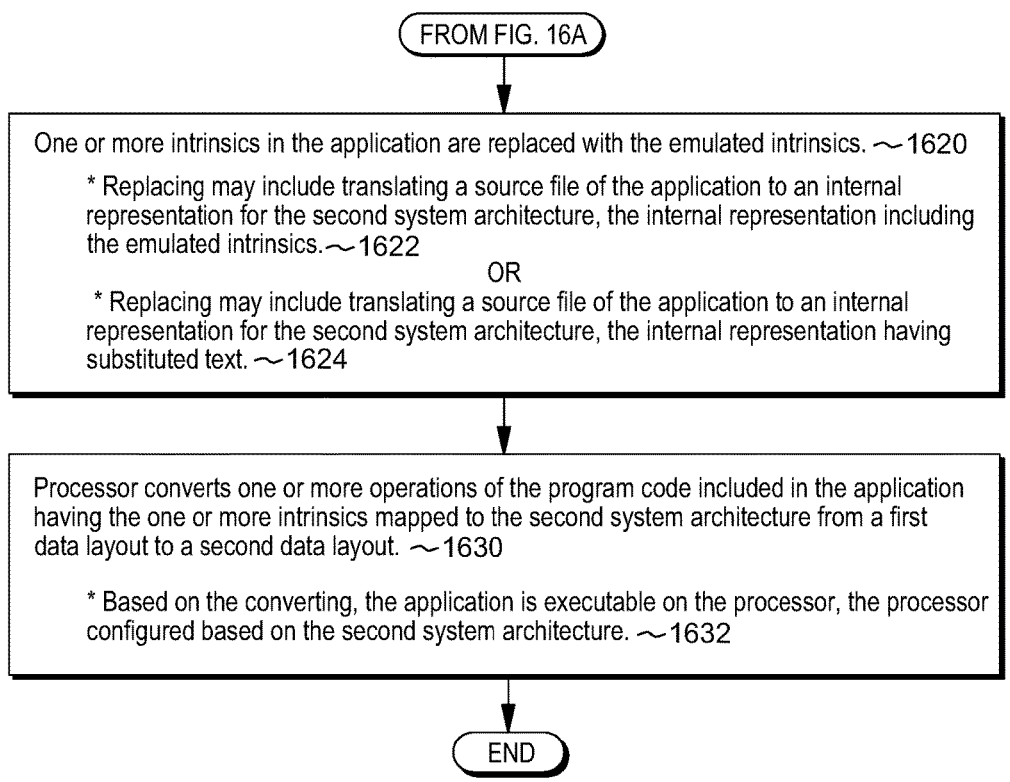

In one implementation, with reference to FIGS. 16A-16B, a processor (e.g., a compiler) obtains program code that depends on vector element ordering, 1600. The program code is part of an application that includes one or more intrinsics, 1602. The one or more intrinsics are mapped from a first system architecture for which the application was written to a second system architecture on which the application is to be executed, 1604. The first system architecture has a first instruction set architecture different from a second instruction set architecture of the second system architecture, 1606.

In one example, the processor may also obtain a description of semantic operations of the one or more intrinsics of the first system architecture, 1608. The processor may use the description to map the one or more intrinsics to emulated intrinsics of the second system architecture, 1610. In one embodiment, using the description to map the one or more intrinsics to emulated intrinsics includes converting the description into a compiler internal language of the second system architecture, 1612. The compiler internal language has a data representation corresponding to the first data layout of the first system architecture, 1614. The compiler internal language with the data representation corresponding to the first data layout of the first system architecture is converted to a compiler internal language with a data representation corresponding to the second data layout of the second system architecture, 1616. Machine code in the second system architecture is generated based on the compiler internal language, 1618.

In one embodiment, one or more intrinsics in the application are replaced with the emulated intrinsics, 1620 (FIG. 16B). The replacing may include, for instance, translating a source file of the application to an internal representation for the second system architecture, the internal representation including the emulated intrinsics, 1622. As a further example, the replacing may include, for instance, translating a source file of the application to an internal representation for the second system architecture, the internal representation including substituted text for the emulated intrinsics, 1624.

Further, in one aspect, the processor converts one or more operations of the program code included in the application having the one or more intrinsics mapped to the second system architecture from a first data layout to a second data layout, 1630.

Based on the converting, the application is executable on the processor; the processor configured based on the second system architecture, 1632.

As described herein, in one or more aspects, a compiler for System Y receives a description of the semantic operations of one or more vector intrinsics of a System X in a description of which compiler Y is cognizant, but for which is independent of a presence of a particular intrinsic of an architecture X. The description is dependent on the compiler being enabled to receive code with a vector data representation corresponding to the vector data representation of the architecture X.

The compiler converts the description into a compiler internal language (CIL) reflective of the compiler Y with a data representation corresponding to the vector data representation of architecture X.

The compiler converts the internal description from the CIL with a vector data representation corresponding to the vector data representation of architecture X to the CIL compiler internal vector data representation corresponding to the vector data representation of architecture Y. The converting further includes optionally introducing one or more additional CIL operations of the CIL in order to map data formats and numberings of a first data representation X to a second data representation Y.

In one embodiment, the compiler optimizes the programming CIL with a data representation corresponding to the data representation of System Y.

Machine code is generated for System Y from the CIL with a vector data representation corresponding to the vector data representation of System Y.

In one or more other aspects, the compiler simultaneously receives, in conjunction with the descriptions, program source code, the program source code further containing vector intrinsics corresponding to vector intrinsics of System X.

Thus, CIL is generated corresponding to the source program in conjunction with generating CIL for the description. The CIL corresponding to the source program is converted in conjunction with converting the CIL for the description.

References to executing a vector intrinsic corresponding to System X in a source program are replaced with the described behavior from the description of the vector intrinsics.

In one aspect, CIL derived from the program containing the vector intrinsics corresponding to System X and the CIL from the description of intrinsics in System X are concurrently co-optimized.

Further, machine code is generated for System Y from the co-optimized CIL with a vector data representation corresponding to the vector data representation of System Y.

In one aspect, a compiler, compiler Y, receives a source program making reference to one or more vector intrinsics corresponding to a vector data ordering corresponding to the vector data ordering of System X. The compiler converts the source program into a compiler internal language (CIL) reflective of the compiler Y with a data representation corresponding to the vector data representation of the architecture X. References to vector intrinsics with function calls corresponding to the vector intrinsics are replaced corresponding to the generated code.

The compiler converts the internal description from a CIL with a vector data representation corresponding to the vector data representation of the architecture X to the CIL compiler internal vector data representation corresponding to the vector data representation of the architecture Y. The converting further includes optionally introducing one or more additional CIL operations of the CIL in order to map data formats and numberings of a first data representation X to a second data representation Y.

The compiler optimizes the program in CIL with a data representation corresponding to the data representation of System Y. Machine code for System Y is generated from the CIL with a vector data representation corresponding to the vector data representation of System Y causing function calls in the compiled code to be linked against the functions above.

In one aspect, references in the source program corresponding to a system specific name (e.g., an intrinsic having a system specific name) are replaced with a generic system-neutral name, the system-neutral name being usable without restrictions to a specific system, when system-specific names are otherwise unavailable.

Optionally, the source code could be modified to select, when it is compiled, a System X name, a System Y name or a system-neutral name.

For instance:

---

```
#if defined(SystemX)
    z = _mm_add_epi32 (x,y); // System X intrinsic name
#elsif defined (SystemY)
    z = vec_add4sw(x,y); // System Y intrinsic name
#else
    for (i=0;i<=3;i++) z[i] = x[i]+y[i]; // generic for other systems
#endif
```

---

Described above are various operations, including, for instance, _mm_add_epi32 and _mm_unpacklo_epi16. However, other operations may be used. A more complex example includes the use of a System Y function, vec_sumabsdiffs16ub, to emulate a System X function, _mm_sad_epu8, which for two groups, each of 8 elements, each containing an 8-bit unsigned integer, first calculates the differences between the left and right values, then calculates the absolute value of those differences, then for each group of 8, calculates the sum of the absolute values as a 64-bit integer. This function is used, for instance, in calculating the compressed values of pixels in video compression and encoding. The _mm_sad_epu8 System X intrinsic is mapped to the System Y vec_subabsdiffs16ub function:

```
/* Sum 2 octets of absolute differences of 16 8-bit unsigned chars into 2 64-bit long
longs
*/
__m128i vec_subabsdiffs16ub (__m128i left, __m128i right)
{
  /* calculate absolute value of differences by first converting to System Y vector type,
    then calculating for each element pair the difference between
    the maximum of the two elements and the minimum of the two elements */
  vector unsigned char maximums = vec_max ((vector unsigned char) left, (vector
unsigned char) right);
  vector unsigned char minimums = vec_min ((vector unsigned char) left, (vector
unsigned char) right);
  vector unsigned char absolute_differences = vec_sub (maximums, minimums);
  /* next calculate the sums of the 4 absolute differences in each 32-bit group */
  vector unsigned int int_sums = vec_sum4s (absolute_differences, vec_splats (0u));
  /* finally calculate the sums of the 2 pairs of 32-bit int elements as 64-bit integers */
  vector signed long long result = vec_sum2s ((vector signed int) int_sums, vec_splats
(0));
  return (__m128i) result;
}
```

This is converted by the compiler into compiler internal language, such as for instance:

```
LD        Rleft = left                            # load left into vector register
                                                   Rleft
CONVERT   Rleft = Rleft, vector_unsigned_char     # reinterpret as new type
LD        Rright = right                          # load right into vector
                                                   register Rright
CONVERT   Rright = Rright, vector_unsigned_char   # reinterpret as new type
VECMAX    Rmax = Rleft, Rright                    # calculate maximum for
                                                   each element pair
VECMIN    Rmin = Rleft, Rright                    # calculate minimum for each
                                                   element pair
VECSUB    Rdiff = Rmax, Rmin                      # calculate difference for
                                                   each element pair
          # max (left,right) − min (left,right) is equivalent to abs (left-right)
VECSPLAT  Rzeros = 0                              # put zeros in each element
VECSUM4S  Rsum4 = Rdiff, Rzeros                   # add groups of 4 elements
VECSUM2S  Rresult = Rsum4, Rzeros                 # add pairs of groups of 4
                                                   elements
CONVERT   Rresult = Rresult, ___m128i             # reinterpret as new type
ST        result = Rresult                        # store result
```

This is then optionally optimized and converted to SystemY machine instructions as shown above.

This example demonstrates, for instance, that emulation is possible even when System Y has no instructions corresponding to the emulated System X instruction or intrinsic.

In this example, the CONVERT internal instructions merely convey information within the compiler and do not lead to any machine instructions. If the System Y CPU allows executing instructions in parallel, the two LD instructions can be executed in parallel, the VECMAX and VECMIN can be executed in parallel, and the VECSPLAT can be executed in parallel with any of the earlier instructions. Thus, the System Y execution time can be as low as 5 instruction times. If the iterations of a loop are overlapped and enough parallelism is available, the net time can approach one vector result per instruction time, so competitive performance can be achieved.

In one aspect, the compiler may be an assembler.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 17:
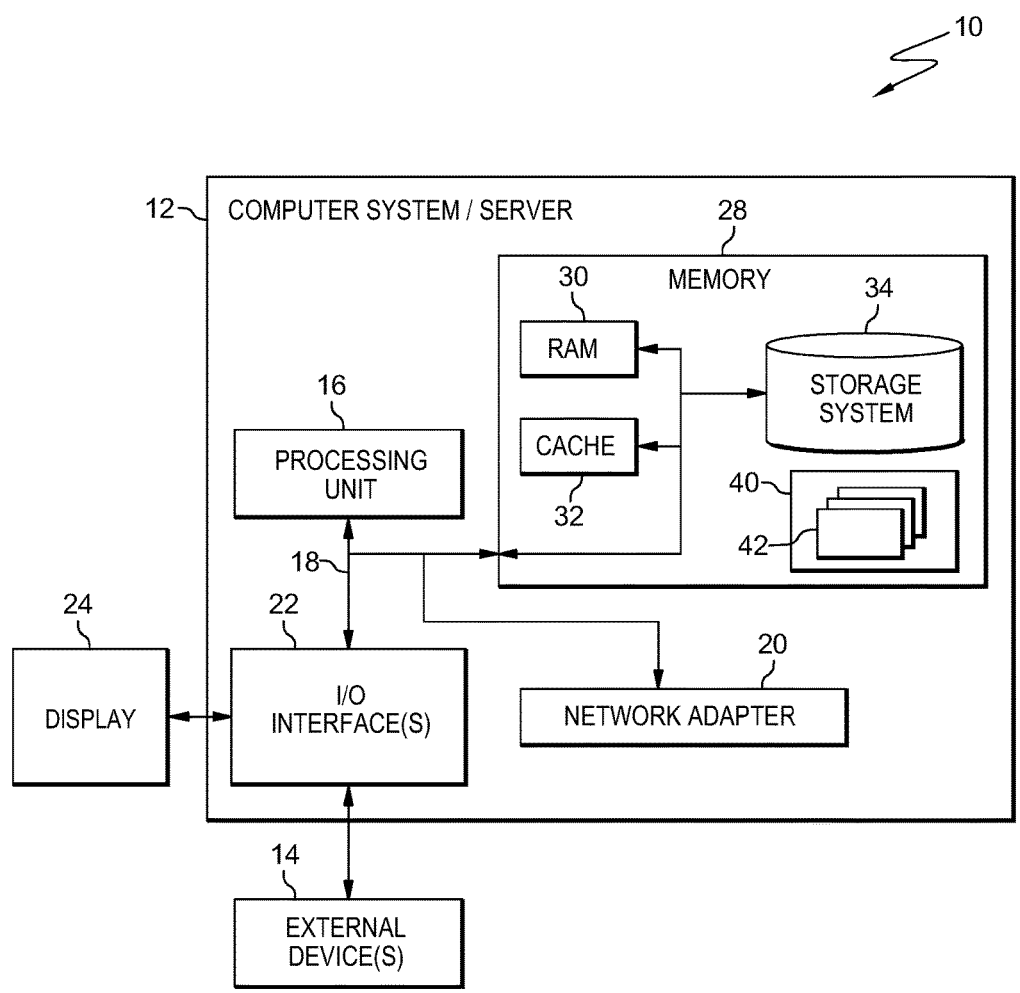
FIG. 17 depicts one embodiment of a cloud computing node.

Referring now to FIG. 17, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 18:
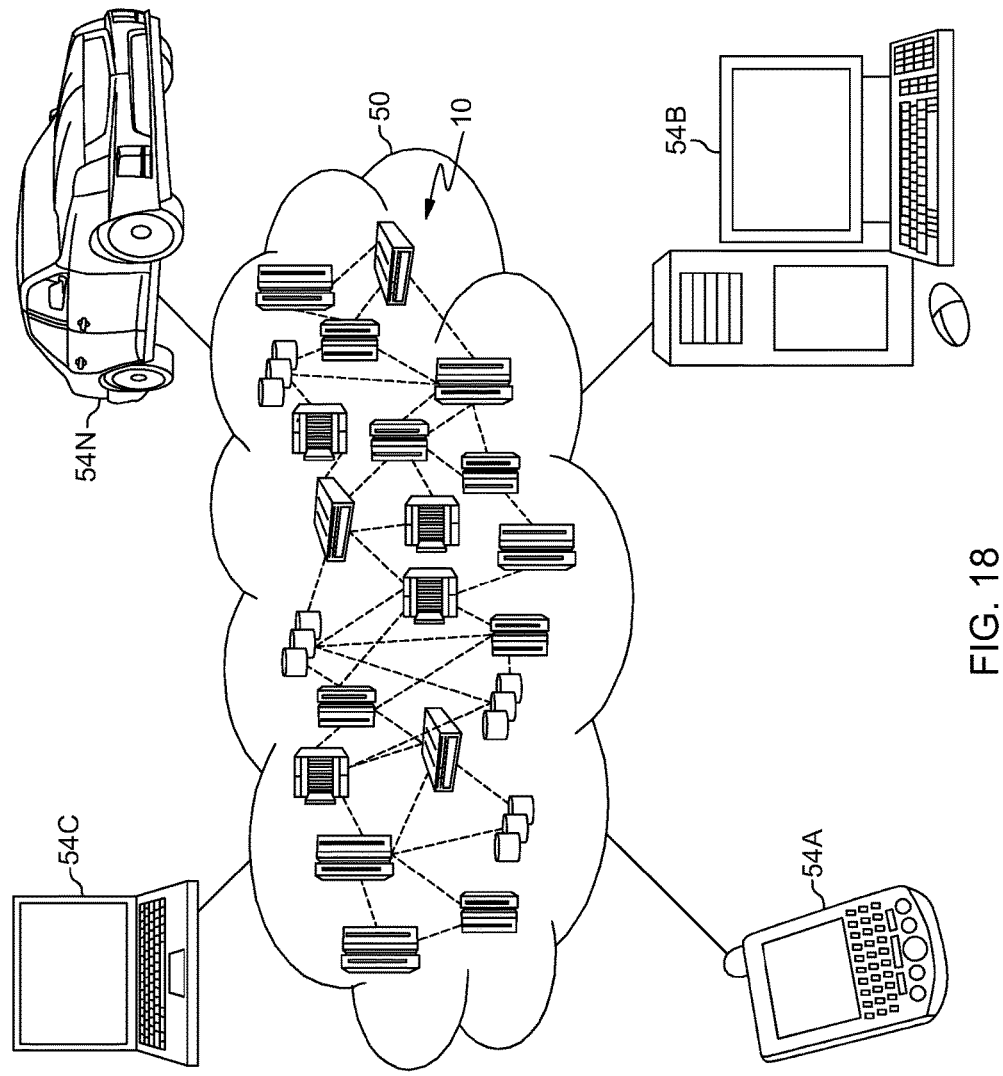
FIG. 18 depicts one embodiment of a cloud computing environment.

Referring now to FIG. 18, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. B are intended to be illustrative only and that computing nodes 10 and cloud computing environment 50 can communicate with any type of computerized device over any type of network and/or network addressable connection (e.g., using a web browser).

Figure 19:
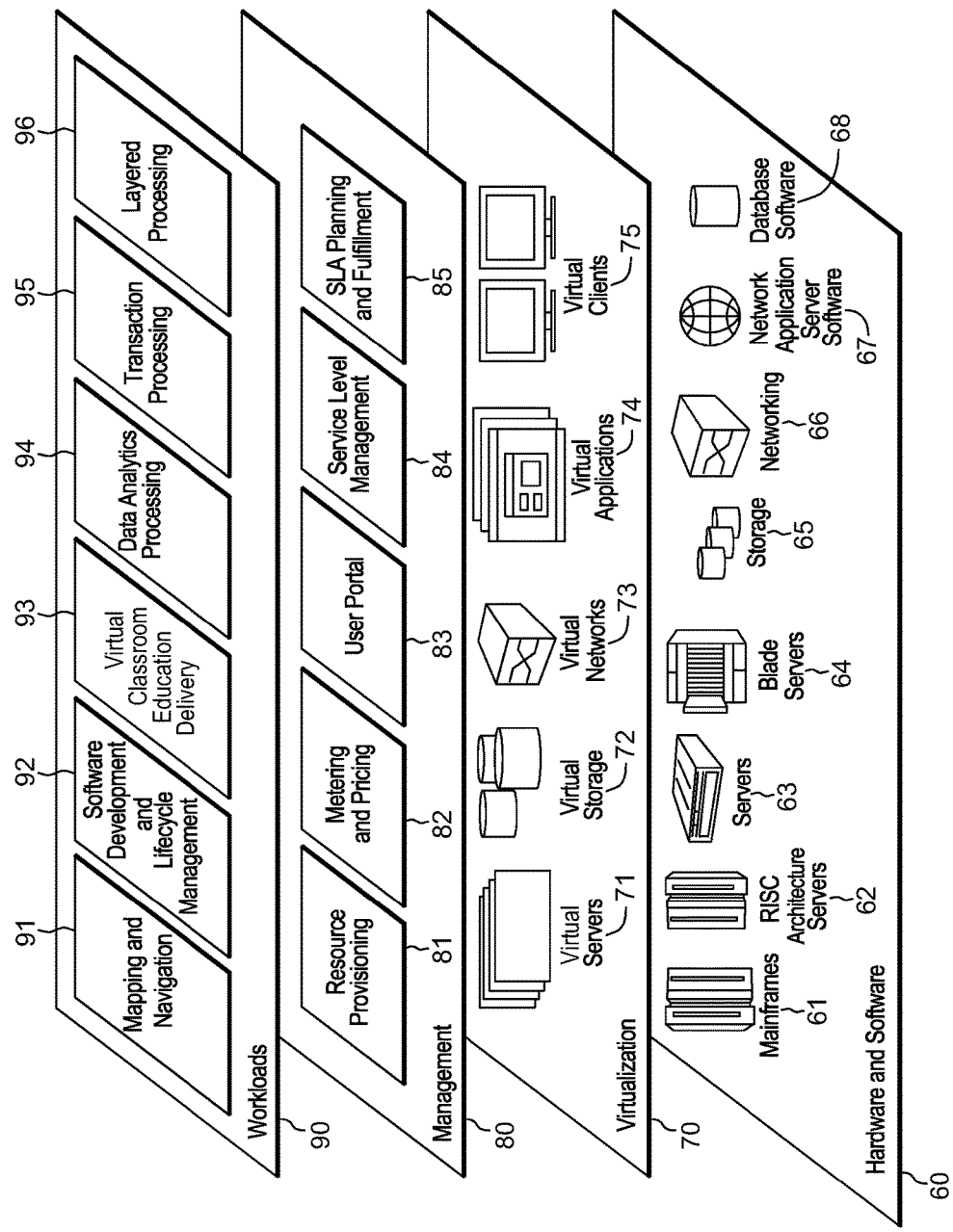
FIG. 19 depicts one example of abstraction model layers.

Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and layered processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of mapping applications between processors of different system architectures, the computer-implemented method comprising:

obtaining, by a processor, program code that depends on vector element ordering, the program code being a part of an application comprising one or more intrinsics, wherein an intrinsic is a built-in function, known by a compiler of the program code, that substitutes a sequence of automatically generated instructions for an original function call, and wherein the one or more intrinsics are mapped in a first level of translation of a multi-level translation scheme from a first computer system architecture for which the application was written to a second computer system architecture, different from the first computer system architecture, on which the application is to be executed, the first computer system architecture having a first instruction set architecture different from a second instruction set architecture of the second computer system architecture, the first instruction set architecture having second instruction set architecture having vector instructions defined based on the second computer system architecture, the first level of translation translating source code of the program code that includes the one or more intrinsics to an internal language of the second instruction set architecture, wherein a data layout of the translated source code remains in a first data layout of the first instruction set architecture; and converting, by the processor, in a second level of translation of the multi-level translation scheme, one or more operations of the program code included in the application comprising the one or more intrinsics mapped to the second computer system architecture from the first data layout to a second data layout, wherein based on the converting, the application is executable on the processor, the processor configured based on the second computer system architecture.

2. The computer-implemented method of claim 1, further comprising:

obtaining, by the processor, a description of semantic operations of the one or more intrinsics of the first computer system architecture; and using the description to map the one or more intrinsics to emulated intrinsics of the second computer system architecture.

3. The computer-implemented method of claim 2, wherein the using the description comprises converting the description into a compiler internal language of the second computer system architecture, the compiler internal language having a data representation corresponding to the first data layout of the first computer system architecture.

4. The computer-implemented method of claim 3, further comprising:

converting the compiler internal language with the data representation of the first computer system architecture to compiler internal language with a data representation corresponding to the second data layout of the second computer system architecture; and generating machine code using the compiler internal language with the data representation of the second computer system architecture.

5. The computer-implemented method of claim 4, further comprising optimizing the compiler internal language.

6. The computer-implemented method of claim 2, further comprising replacing the one or more intrinsics in the application with the emulated intrinsics obtained from the description.

7. The computer-implemented method of claim 6, further comprising generating machine code for the application in the second computer system architecture, the machine code having a data representation corresponding to the second data layout of the second computer system architecture.

8. The computer-implemented method of claim 6, wherein the replacing comprises translating a source file of the application having the one or more intrinsics to an internal representation for the second computer system architecture, the internal representation including the emulated intrinsics.

9. The computer-implemented method of claim 6, wherein the replacing comprises translating a source file of the application having the one or more intrinsics to an internal representation for the second computer system architecture, the internal representation having substituted text for the emulated intrinsics.

10. A computer program product for mapping applications between processors of different system architectures, the computer program product comprising:

a non-transitory computer readable storage medium readable by a processing circuit and storing instructions for performing a method comprising:

obtaining, by a processor, program code that depends on vector element ordering, the program code being a part of an application comprising one or more intrinsics, wherein an intrinsic is a built-in function, known by a compiler of the program code, that substitutes a sequence of automatically generated instructions for an original function call, and wherein the one or more intrinsics are mapped in a first level of translation of a multi-level translation scheme from a first computer system architecture for which the application was written to a second computer system architecture, different from the first computer system architecture, on which the application is to be executed, the first computer system architecture having a first instruction set architecture different from a second instruction set architecture of the second computer system architecture, the first instruction set architecture having vector instruction defined based on the first computer system architecture and the second instruction set architecture having vector instructions defined based on the second computer system architecture, the first level of translation translating source code of the program code that includes the one or more intrinsics to an internal language of the second instruction set architecture, wherein a data layout of the translated source code remains in a first data layout of the first instruction set architecture; and converting, by the processor, in a second level of translation of the multi-level translation scheme, one or more operations of the program code included in the application comprising the one or more intrinsics mapped to the second computer system architecture from the first data layout to a second data layout, wherein based on the converting, the application is executable on the processor, the processor configured based on the second computer system architecture.

11. The computer program product of claim 10, wherein the method further comprises:

obtaining, by the processor, a description of semantic operations of the one or more intrinsics of the first computer system architecture; and using the description to map the one or more intrinsics to emulated intrinsics of the second computer system architecture.

12. The computer program product of claim 11, wherein the using the description comprises converting the description into a compiler internal language of the second computer system architecture, the compiler internal language having a data representation corresponding to the first data layout of the first computer system architecture.

13. The computer program product of claim 12, wherein the method further comprises:

converting the compiler internal language with the data representation of the first computer system architecture to compiler internal language with a data representation corresponding to the second data layout of the second computer system architecture; and generating machine code using the compiler internal language with the data representation of the second computer system architecture.

14. The computer program product of claim 11, wherein the method further comprises replacing the one or more intrinsics in the application with the emulated intrinsics obtained from the description.

15. The computer program product of claim 14, wherein the method further comprises generating machine code for the application in the second computer system architecture, the machine code having a data representation corresponding to the second data layout of the second computer system architecture.

16. A computer system for mapping applications between processors of different system architectures, the computer system comprising:
   a memory; and
   a processor in communication with the memory, wherein the computer system is configured to perform a method, said method comprising:
      obtaining, by the processor, program code that depends on vector element ordering, the program code being a part of an application comprising one or more intrinsics, wherein an intrinsic is a built-in function, known by a compiler of the program code, that substitutes a sequence of automatically generated instructions for an original function call, and wherein the one or more intrinsics are mapped in a first level of translation of a multi-level translation scheme from a first computer system architecture for which the application was written to a second computer system architecture, different from the first computer system architecture, on which the application is to be executed, the first computer system architecture having a first instruction set architecture different from a second instruction set architecture of the second computer system architecture, the first instruction set architecture having vector instruction defined based on the first computer system architecture and the second instruction set architecture having vector instructions defined based on the second computer system architecture, the first level of translation translating source code of the program code that includes the one or more intrinsics to an internal language of the second instruction set architecture, wherein a data layout of the translated source code remains in a first data layout of the first instruction set architecture; and
      converting, by the processor, in a second level of translation of the multi-level translation scheme, one or more operations of the program code included in the application comprising the one or more intrinsics mapped to the second computer system architecture from the first data layout to a second data layout, wherein based on the converting, the application is executable on the processor, the processor configured based on the second computer system architecture.

17. The computer system of claim 16, wherein the method further comprises:
   obtaining, by the processor, a description of semantic operations of the one or more intrinsics of the first computer system architecture; and
   using the description to map the one or more intrinsics to emulated intrinsics of the second computer system architecture.

18. The computer system of claim 16, wherein the using the description comprises converting the description into a compiler internal language of the second computer system architecture, the compiler internal language having a data representation corresponding to the first data layout of the first computer system architecture.

19. The computer system of claim 17, wherein the method further comprises:
   converting the compiler internal language with the data representation of the first computer system architecture to compiler internal language with a data representation corresponding to the second data layout of the second computer system architecture; and
   generating machine code using the compiler internal language with the data representation of the second computer system architecture.

20. The computer system of claim 16, wherein the method further comprises replacing the one or more intrinsics in the application with the emulated intrinsics obtained from the description.

* * * * *